US 8,001,459 B2

(12) United States Patent
Rivers-Moore et al.

(10) Patent No.: US 8,001,459 B2
(45) Date of Patent: Aug. 16, 2011

(54) ENABLING ELECTRONIC DOCUMENTS FOR LIMITED-CAPABILITY COMPUTING DEVICES

(75) Inventors: Jonathan E. Rivers-Moore, Bellevue, WA (US); Petru M Moldovanu, Redmond, WA (US); Balbir Singh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1063 days.

(21) Appl. No.: 11/295,178

(22) Filed: Dec. 5, 2005

(65) Prior Publication Data
US 2007/0130500 A1 Jun. 7, 2007

(51) Int. Cl.
*G06F 17/00* (2006.01)
(52) U.S. Cl. ........................................ 715/205; 715/234
(58) Field of Classification Search ................... 715/205
See application file for complete search history.

(56) References Cited

U.S. PATENT DOCUMENTS

| | | | |
|---|---|---|---|
| 2,804,878 A | 9/1957 | Fishwood et al. |
| 3,091,077 A | 5/1963 | Erickson et al. |
| 3,104,520 A | 9/1963 | Cazier et al. |
| 3,195,805 A | 7/1965 | Cholvin et al. |
| 3,196,606 A | 7/1965 | Cholvin et al. |
| 3,812,942 A | 5/1974 | Espenschied et al. |
| 3,874,828 A | 4/1975 | Herschler et al. |
| 3,961,748 A | 6/1976 | McNabney |
| 4,005,578 A | 2/1977 | McInerney |
| 4,005,579 A | 2/1977 | Lloyd |
| 4,060,340 A | 11/1977 | Yanik et al. |
| 4,089,623 A | 5/1978 | Hofmann, Jr. |
| 4,201,978 A | 5/1980 | Nally |
| 4,256,019 A | 3/1981 | Braddick |
| 4,362,475 A | 12/1982 | Seitz |
| 4,391,184 A | 7/1983 | Yamane et al. |
| 4,396,345 A | 8/1983 | Hutchinson |
| 4,498,147 A | 2/1985 | Agnew et al. |
| 4,514,800 A | 4/1985 | Gruner et al. |
| 4,514,985 A | 5/1985 | Cadeddu |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |

(Continued)

FOREIGN PATENT DOCUMENTS

EP 0841615 5/1998

(Continued)

OTHER PUBLICATIONS

Jeff Prosise, "Programing Microsoft Net", May 15, 2002, Microsoft Press, ISBN- 13: 978-0-7356-1376-8, pp. 1-24. URL: <http://academic.safaribooksonline.com/print?xmlid=0-7356-1376-1/1DAVO3T>.*

(Continued)

*Primary Examiner* — Laurie Ries
*Assistant Examiner* — Mustafa Amin

(57) ABSTRACT

System(s), method(s), and/or techniques ("tools") are described that enable electronic document functionality for a limited-capability computing device. The tools may enable a computing device with limited display capabilities to present and enable navigation through nested items or hierarchical view levels of an electronic document. The tools may also build renderable view information by which a device may enable electronic document functionality based on the capabilities of that device.

20 Claims, 8 Drawing Sheets

U.S. PATENT DOCUMENTS

| | | |
|---|---|---|
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,257,646 A | 11/1993 | Meyer |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,388,967 A | 2/1995 | Firnhaber et al. |
| 5,388,968 A | 2/1995 | Wood et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,428,738 A | 6/1995 | Carter et al. |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,456,582 A | 10/1995 | Firnhaber et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,537,596 A | 7/1996 | Yu et al. |
| 5,540,558 A | 7/1996 | Harden et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,556,271 A | 9/1996 | Zuercher et al. |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,613,837 A | 3/1997 | Konishi et al. |
| 5,625,783 A | 4/1997 | Ezekiel et al. |
| 5,627,979 A | 5/1997 | Chang et al. |
| 5,630,126 A | 5/1997 | Redpath |
| 5,630,706 A | 5/1997 | Yang |
| 5,634,113 A | 5/1997 | Rusterholz |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,655,887 A | 8/1997 | Chou |
| 5,659,729 A | 8/1997 | Nielsen |
| 5,664,133 A | 9/1997 | Malamud et al. |
| 5,664,178 A | 9/1997 | Sinofsky |
| 5,664,938 A | 9/1997 | Yang |
| 5,668,966 A | 9/1997 | Ono et al. |
| 5,669,005 A | 9/1997 | Curbow et al. |
| 5,681,151 A | 10/1997 | Wood |
| 5,682,536 A | 10/1997 | Atkinson et al. |
| 5,689,667 A | 11/1997 | Kurtenbach |
| 5,689,703 A | 11/1997 | Atkinson et al. |
| 5,692,540 A | 12/1997 | Huang |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,785,081 A | 7/1998 | Krawczyk et al. |
| 5,787,274 A | 7/1998 | Agrawal et al. |
| 5,790,796 A | 8/1998 | Sadowsky |
| 5,798,757 A | 8/1998 | Smith |
| 5,799,311 A | 8/1998 | Agrawal et al. |
| 5,801,701 A | 9/1998 | Koppolu et al. |
| 5,802,304 A | 9/1998 | Stone |
| 5,803,715 A | 9/1998 | Kitchener |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,870,735 A | 2/1999 | Agrawal et al. |
| 5,873,088 A | 2/1999 | Hayashi et al. |
| 5,875,815 A | 3/1999 | Ungerecht et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,928,363 A | 7/1999 | Ruvolo |
| 5,929,858 A | 7/1999 | Shibata et al. |
| RE36,281 E | 8/1999 | Zuercher et al. |
| 5,940,075 A | 8/1999 | Mutschler, III et al. |
| 5,947,711 A | 9/1999 | Myers et al. |
| 5,950,010 A | 9/1999 | Hesse et al. |

| | | | | | | |
|---|---|---|---|---|---|---|
| 5,950,221 | A | 9/1999 | Draves et al. | 6,253,366 B1 | 6/2001 | Mutschler, III |
| 5,953,731 | A | 9/1999 | Glaser | 6,253,374 B1 | 6/2001 | Dresevic et al. |
| 5,956,481 | A | 9/1999 | Walsh et al. | 6,263,313 B1 | 7/2001 | Milsted et al. |
| 5,960,199 | A | 9/1999 | Brodsky et al. | 6,266,810 B1 | 7/2001 | Tanaka et al. |
| 5,963,964 | A | 10/1999 | Nielsen | 6,268,852 B1 | 7/2001 | Lindhorst et al. |
| 5,973,696 | A | 10/1999 | Agranat et al. | 6,275,227 B1 | 8/2001 | DeStefano |
| 5,974,454 | A | 10/1999 | Apfel et al. | 6,275,599 B1 | 8/2001 | Adler et al. |
| 5,982,370 | A | 11/1999 | Kamper | 6,279,042 B1 | 8/2001 | Ouchi |
| 5,983,348 | A | 11/1999 | Ji | 6,281,896 B1 | 8/2001 | Alimpich et al. |
| 5,987,480 | A | 11/1999 | Donohue et al. | 6,282,709 B1 | 8/2001 | Reha et al. |
| 5,991,710 | A | 11/1999 | Papineni et al. | 6,282,711 B1 | 8/2001 | Halpern et al. |
| 5,991,731 | A | 11/1999 | Colon et al. | 6,286,033 B1 | 9/2001 | Kishinsky et al. |
| 5,991,877 | A | 11/1999 | Luckenbaugh | 6,286,130 B1 | 9/2001 | Poulsen et al. |
| 5,995,103 | A | 11/1999 | Ashe | 6,292,897 B1 | 9/2001 | Gennaro et al. |
| 5,999,740 | A | 12/1999 | Rowley | 6,292,941 B1 | 9/2001 | Jollands |
| 6,005,570 | A | 12/1999 | Gayraud et al. | 6,297,819 B1 | 10/2001 | Furst |
| 6,006,227 | A | 12/1999 | Freeman et al. | 6,300,948 B1 | 10/2001 | Geller et al. |
| 6,006,241 | A | 12/1999 | Purnaveja et al. | 6,307,955 B1 | 10/2001 | Zank et al. |
| 6,012,066 | A | 1/2000 | Discount et al. | 6,308,179 B1 | 10/2001 | Petersen et al. |
| 6,014,135 | A | 1/2000 | Fernandes | 6,308,273 B1 | 10/2001 | Goertzel et al. |
| 6,016,520 | A | 1/2000 | Facq et al. | 6,311,221 B1 | 10/2001 | Raz et al. |
| 6,018,743 | A | 1/2000 | Xu | 6,311,271 B1 | 10/2001 | Gennaro et al. |
| 6,021,403 | A | 2/2000 | Horvitz et al. | 6,314,415 B1 | 11/2001 | Mukherjee |
| 6,026,379 | A | 2/2000 | Haller et al. | 6,321,259 B1 | 11/2001 | Ouellette et al. |
| 6,026,416 | A | 2/2000 | Kanerva et al. | 6,321,334 B1 | 11/2001 | Jerger et al. |
| 6,031,989 | A | 2/2000 | Cordell | 6,327,628 B1 | 12/2001 | Anuff et al. |
| 6,035,297 | A | 3/2000 | Van Huben et al. | 6,331,864 B1 | 12/2001 | Coco et al. |
| 6,035,309 | A | 3/2000 | Dauerer et al. | 6,336,214 B1 | 1/2002 | Sundaresan |
| 6,044,205 | A | 3/2000 | Reed et al. | 6,336,797 B1 | 1/2002 | Kazakis et al. |
| 6,052,531 | A | 4/2000 | Waldin et al. | 6,342,907 B1 | 1/2002 | Petty et al. |
| 6,052,710 | A | 4/2000 | Saliba et al. | 6,343,149 B1 | 1/2002 | Motoiwa |
| 6,054,987 | A | 4/2000 | Richardson | 6,343,302 B1 | 1/2002 | Graham |
| 6,057,837 | A | 5/2000 | Hatakeda et al. | 6,343,377 B1 | 1/2002 | Gessner et al. |
| 6,058,413 | A | 5/2000 | Flores et al. | 6,344,862 B1 | 2/2002 | Williams et al. |
| 6,065,043 | A | 5/2000 | Domenikos et al. | 6,345,256 B1 | 2/2002 | Milsted et al. |
| 6,069,626 | A | 5/2000 | Cline et al. | 6,345,278 B1 | 2/2002 | Hitchcock et al. |
| 6,070,184 | A | 5/2000 | Blount et al. | 6,345,361 B1 | 2/2002 | Jerger et al. |
| 6,072,870 | A | 6/2000 | Nguyen et al. | 6,347,323 B1 | 2/2002 | Garber et al. |
| 6,078,326 | A | 6/2000 | Kilmer et al. | 6,349,408 B1 | 2/2002 | Smith |
| 6,078,327 | A | 6/2000 | Liman et al. | 6,351,574 B1 | 2/2002 | Yair et al. |
| 6,078,924 | A | 6/2000 | Ainsbury et al. | 6,353,851 B1 | 3/2002 | Anupam et al. |
| 6,081,610 | A | 6/2000 | Dwork et al. | 6,353,926 B1 | 3/2002 | Parthesarathy et al. |
| 6,084,585 | A | 7/2000 | Kraft et al. | 6,356,906 B1 | 3/2002 | Lippert et al. |
| 6,088,679 | A | 7/2000 | Barkley | 6,357,038 B1 | 3/2002 | Scouten |
| 6,088,708 | A | 7/2000 | Burch et al. | 6,366,907 B1 | 4/2002 | Fanning et al. |
| 6,091,417 | A | 7/2000 | Lefkowitz | 6,366,912 B1 | 4/2002 | Wallent et al. |
| 6,094,657 | A | 7/2000 | Hailpern et al. | 6,367,013 B1 | 4/2002 | Bisbee et al. |
| 6,096,096 | A | 8/2000 | Murphy et al. | 6,369,840 B1 | 4/2002 | Barnett et al. |
| 6,097,382 | A | 8/2000 | Rosen et al. | 6,369,841 B1 | 4/2002 | Salomon et al. |
| 6,098,081 | A | 8/2000 | Heidorn et al. | 6,374,402 B1 | 4/2002 | Schmeidler et al. |
| 6,105,012 | A | 8/2000 | Chang et al. | 6,381,742 B2 | 4/2002 | Forbes et al. |
| 6,106,570 | A | 8/2000 | Mizuhara | 6,381,743 B1 | 4/2002 | Mutschler, III |
| 6,108,637 | A | 8/2000 | Blumenau | 6,385,767 B1 | 5/2002 | Ziebell |
| 6,108,783 | A | 8/2000 | Krawczyk et al. | 6,389,434 B1 | 5/2002 | Rivette et al. |
| 6,115,646 | A | 9/2000 | Fiszman et al. | 6,393,456 B1 | 5/2002 | Ambler et al. |
| 6,121,965 | A | 9/2000 | Kenney et al. | 6,393,469 B1 | 5/2002 | Dozier et al. |
| 6,122,647 | A | 9/2000 | Horowitz et al. | 6,396,488 B1 | 5/2002 | Simmons et al. |
| 6,144,969 | A | 11/2000 | Inokuchi et al. | 6,397,264 B1 | 5/2002 | Stasnick et al. |
| 6,151,624 | A | 11/2000 | Teare et al. | 6,401,077 B1 | 6/2002 | Godden et al. |
| 6,154,128 | A | 11/2000 | Wookey et al. | 6,405,221 B1 | 6/2002 | Levine et al. |
| 6,163,772 | A | 12/2000 | Kramer et al. | 6,405,238 B1 | 6/2002 | Votipka |
| 6,167,521 | A | 12/2000 | Smith et al. | 6,408,311 B1 | 6/2002 | Baisley et al. |
| 6,167,523 | A | 12/2000 | Strong | 6,414,700 B1 | 7/2002 | Kurtenbach et al. |
| 6,178,551 | B1 | 1/2001 | Sana et al. | 6,421,070 B1 | 7/2002 | Ramos et al. |
| 6,182,094 | B1 | 1/2001 | Humpleman et al. | 6,421,656 B1 | 7/2002 | Cheng et al. |
| 6,182,095 | B1 | 1/2001 | Leymaster et al. | 6,421,777 B1 | 7/2002 | Pierre-Louis |
| 6,188,401 | B1 | 2/2001 | Peyer | 6,425,125 B1 | 7/2002 | Fries et al. |
| 6,191,797 | B1 | 2/2001 | Politis | 6,427,142 B1 | 7/2002 | Zachary et al. |
| 6,192,367 | B1 | 2/2001 | Hawley et al. | 6,429,885 B1 | 8/2002 | Saib et al. |
| 6,195,661 | B1 | 2/2001 | Filepp et al. | 6,434,563 B1 | 8/2002 | Pasquali et al. |
| 6,199,204 | B1 | 3/2001 | Donohue | 6,434,564 B2 | 8/2002 | Ebert |
| 6,209,128 | B1 | 3/2001 | Gerard et al. | 6,434,743 B1 | 8/2002 | Click et al. |
| 6,216,152 | B1 | 4/2001 | Wong et al. | 6,442,563 B1 | 8/2002 | Bacon et al. |
| 6,219,423 | B1 | 4/2001 | Davis | 6,442,755 B1 | 8/2002 | Lemmons et al. |
| 6,219,698 | B1 | 4/2001 | Iannucci et al. | 6,446,110 B1 | 9/2002 | Lection et al. |
| 6,225,996 | B1 | 5/2001 | Gibb et al. | 6,449,617 B1 | 9/2002 | Quinn et al. |
| 6,235,027 | B1 | 5/2001 | Herzon | 6,457,009 B1 | 9/2002 | Bollay |
| 6,243,088 | B1 | 6/2001 | McCormack et al. | 6,460,058 B2 | 10/2002 | Koppolu et al. |
| 6,247,016 | B1 | 6/2001 | Rastogi et al. | 6,463,419 B1 | 10/2002 | Kluss |

| | | |
|---|---|---|
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,006 B1 | 12/2002 | Gourdol et al. |
| 6,493,007 B1 | 12/2002 | Pang |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chan et al. |
| 6,505,344 B1 | 1/2003 | Blais et al. |
| 6,507,856 B1 | 1/2003 | Chen et al. |
| 6,513,154 B1 | 1/2003 | Porterfield |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| 6,539,464 B1 | 3/2003 | Getov |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,604,238 B1 | 8/2003 | Lim et al. |
| 6,606,606 B2 | 8/2003 | Starr |
| 6,609,200 B2 | 8/2003 | Anderson et al. |
| 6,611,812 B2 | 8/2003 | Hurtado et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,625,622 B1 | 9/2003 | Henrickson et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1* | 10/2003 | Sobeski et al. ............... 715/762 |
| 6,635,089 B1 | 10/2003 | Burkett et al. |
| 6,636,845 B2 | 10/2003 | Chau et al. |
| 6,640,249 B1 | 10/2003 | Bowman-Amuah |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,658,652 B1 | 12/2003 | Alexander et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Lapstun et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,766,526 B1 | 7/2004 | Ellis |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,823,478 B1 | 11/2004 | Prologo et al. |
| 6,828,992 B1 | 12/2004 | Freeman et al. |
| 6,829,745 B2 | 12/2004 | Yassin et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,874,143 B1 | 3/2005 | Murray |
| 6,876,996 B2 | 4/2005 | Czajkowski et al. |
| 6,883,168 B1 | 4/2005 | James et al. |
| 6,885,748 B1 | 4/2005 | Wang |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,129 B2 | 9/2005 | Marce et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1* | 9/2005 | Hargraves et al. ............ 715/207 |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |

| Patent No. | Date | Inventor | Ref. |
|---|---|---|---|
| 7,013,340 B1 * | 3/2006 | Burd et al. | 709/229 |
| 7,020,869 B2 | 3/2006 | Abrari et al. | |
| 7,024,417 B1 | 4/2006 | Russakovsky et al. | |
| 7,032,170 B2 | 4/2006 | Poulose | |
| 7,036,072 B1 | 4/2006 | Sulistio et al. | |
| 7,039,875 B2 | 5/2006 | Khalfay et al. | |
| 7,043,687 B2 | 5/2006 | Knauss et al. | |
| 7,051,273 B1 | 5/2006 | Holt et al. | |
| 7,058,645 B2 | 6/2006 | Seto et al. | |
| 7,058,663 B2 | 6/2006 | Johnston et al. | |
| 7,062,764 B2 | 6/2006 | Cohen et al. | |
| 7,065,493 B1 | 6/2006 | Homsi | |
| 7,076,728 B2 | 7/2006 | Davis et al. | |
| 7,080,083 B2 | 7/2006 | Kim et al. | |
| 7,080,325 B2 | 7/2006 | Treibach-Heck et al. | |
| 7,081,882 B2 * | 7/2006 | Sowden et al. | 345/156 |
| 7,086,009 B2 | 8/2006 | Resnick et al. | |
| 7,086,042 B2 | 8/2006 | Abe et al. | |
| 7,088,374 B2 | 8/2006 | David et al. | |
| 7,100,147 B2 | 8/2006 | Miller et al. | |
| 7,103,611 B2 | 9/2006 | Murthy et al. | |
| 7,106,888 B1 | 9/2006 | Silverbrook et al. | |
| 7,107,282 B1 | 9/2006 | Yalamanchi | |
| 7,107,521 B2 | 9/2006 | Santos | |
| 7,107,522 B1 | 9/2006 | Morgan et al. | |
| 7,107,539 B2 | 9/2006 | Abbott et al. | |
| 7,120,863 B1 | 10/2006 | Wang | |
| 7,124,167 B1 | 10/2006 | Bellotti et al. | |
| 7,124,251 B2 | 10/2006 | Clark et al. | |
| 7,130,885 B2 | 10/2006 | Chandra et al. | |
| 7,143,341 B1 | 11/2006 | Kohli | |
| 7,146,564 B2 | 12/2006 | Kim et al. | |
| 7,152,027 B2 | 12/2006 | Andrade et al. | |
| 7,152,205 B2 | 12/2006 | Day et al. | |
| 7,159,011 B1 | 1/2007 | Knight et al. | |
| 7,168,035 B1 | 1/2007 | Bell et al. | |
| 7,178,166 B1 | 2/2007 | Taylor et al. | |
| 7,190,376 B1 | 3/2007 | Tonisson | |
| 7,191,394 B1 | 3/2007 | Ardeleanu et al. | |
| 7,197,515 B2 | 3/2007 | Rivers-Moore et al. | |
| 7,200,665 B2 | 4/2007 | Eshghi et al. | |
| 7,200,816 B2 | 4/2007 | Falk et al. | |
| 7,213,200 B2 | 5/2007 | Abe et al. | |
| 7,228,541 B2 | 6/2007 | Gupton et al. | |
| 7,234,105 B2 | 6/2007 | Bezrukov et al. | |
| 7,236,982 B2 | 6/2007 | Zlatanov et al. | |
| 7,237,114 B1 | 6/2007 | Rosenberg | |
| 7,249,328 B1 | 7/2007 | Davis | |
| 7,251,777 B1 | 7/2007 | Valtchev et al. | |
| 7,269,664 B2 | 9/2007 | Hutsch et al. | |
| 7,269,788 B2 | 9/2007 | Gharavy | |
| 7,272,815 B1 | 9/2007 | Eldridge | |
| 7,275,216 B2 | 9/2007 | Paoli et al. | |
| 7,281,018 B1 | 10/2007 | Begun et al. | |
| 7,281,206 B2 | 10/2007 | Schnelle et al. | |
| 7,281,245 B2 | 10/2007 | Reynar et al. | |
| 7,284,208 B2 | 10/2007 | Matthews | |
| 7,287,218 B1 | 10/2007 | Knotz et al. | |
| 7,293,268 B2 | 11/2007 | Masuda et al. | |
| 7,296,017 B2 | 11/2007 | Larcheveque et al. | |
| 7,308,646 B1 | 12/2007 | Cohen et al. | |
| 7,313,757 B2 | 12/2007 | Bradley et al. | |
| 7,313,758 B2 | 12/2007 | Kozlov | |
| 7,316,003 B1 | 1/2008 | Dulepet et al. | |
| 7,318,237 B2 | 1/2008 | Moriconi et al. | |
| 7,334,187 B1 | 2/2008 | Stanciu et al. | |
| 7,337,391 B2 | 2/2008 | Clarke et al. | |
| 7,337,392 B2 * | 2/2008 | Lue | 715/234 |
| 7,346,610 B2 | 3/2008 | Ruthfield et al. | |
| 7,346,840 B1 * | 3/2008 | Ravishankar et al. | 715/234 |
| 7,346,848 B1 | 3/2008 | Ruthfield et al. | |
| 7,350,141 B2 * | 3/2008 | Kotler et al. | 715/209 |
| 7,370,066 B1 | 5/2008 | Sikchi et al. | |
| 7,373,595 B2 | 5/2008 | Jones et al. | |
| 7,376,673 B1 | 5/2008 | Chalecki et al. | |
| 7,406,660 B1 | 7/2008 | Sikchi et al. | |
| 7,412,649 B2 | 8/2008 | Emek et al. | |
| 7,424,671 B2 | 9/2008 | Elza et al. | |
| 7,428,699 B1 * | 9/2008 | Kane et al. | 715/236 |
| 7,430,711 B2 | 9/2008 | Rivers-Moore et al. | |
| 7,441,200 B2 * | 10/2008 | Savage | 715/762 |
| 7,451,392 B1 | 11/2008 | Chalecki et al. | |
| 7,490,109 B1 | 2/2009 | Sikchi et al. | |
| 7,490,167 B2 | 2/2009 | Pena et al. | |
| 7,496,632 B2 | 2/2009 | Chapman et al. | |
| 7,496,837 B2 | 2/2009 | Larcheveque et al. | |
| 7,512,896 B2 | 3/2009 | Rockey et al. | |
| 7,516,399 B2 | 4/2009 | Hsu et al. | |
| 7,533,268 B1 | 5/2009 | Catorcini | |
| 7,543,228 B2 | 6/2009 | Kelkar | |
| 7,549,115 B2 | 6/2009 | Kotler | |
| 7,562,215 B2 | 7/2009 | Cummins | |
| 7,568,101 B1 | 7/2009 | Catorcini | |
| 7,581,177 B1 | 8/2009 | Mollicone et al. | |
| 7,610,562 B2 | 10/2009 | Rockey et al. | |
| 7,613,996 B2 | 11/2009 | Dallett et al. | |
| 7,624,356 B1 | 11/2009 | Rockey et al. | |
| 7,653,687 B2 | 1/2010 | Reisman | |
| 7,669,116 B2 | 2/2010 | Lopata et al. | |
| 7,673,227 B2 | 3/2010 | Kotler | |
| 7,673,228 B2 | 3/2010 | Kelkar | |
| 7,676,843 B1 | 3/2010 | Stott | |
| 7,689,929 B2 | 3/2010 | Ruthfield et al. | |
| 7,692,636 B2 | 4/2010 | Kim et al. | |
| 7,712,022 B2 | 5/2010 | Smuga et al. | |
| 7,712,048 B2 | 5/2010 | Rockey et al. | |
| 7,721,190 B2 | 5/2010 | Sikchi et al. | |
| 7,725,834 B2 | 5/2010 | Bell et al. | |
| 7,743,063 B2 | 6/2010 | James et al. | |
| 7,774,620 B1 | 8/2010 | Stott et al. | |
| 7,779,027 B2 | 8/2010 | James et al. | |
| 7,809,698 B1 | 10/2010 | Salz et al. | |
| 7,818,677 B2 | 10/2010 | Ruthfield | |
| 7,865,477 B2 | 1/2011 | Larcheveque et al. | |
| 7,900,134 B2 | 3/2011 | Ardeleanu | |
| 7,913,159 B2 | 3/2011 | Larcheveque et al. | |
| 7,925,621 B2 | 4/2011 | Sikchi | |
| 7,937,651 B2 | 5/2011 | Kelkar | |
| 7,971,139 | 6/2011 | Stanciu | |
| 2001/0003828 A1 | 6/2001 | Peterson et al. | |
| 2001/0007109 A1 | 7/2001 | Lange | |
| 2001/0016880 A1 * | 8/2001 | Cai et al. | 709/321 |
| 2001/0022592 A1 | 9/2001 | Alimpich et al. | |
| 2001/0024195 A1 | 9/2001 | Hayakawa | |
| 2001/0037345 A1 | 11/2001 | Kiernan et al. | |
| 2001/0044850 A1 | 11/2001 | Raz et al. | |
| 2001/0051928 A1 | 12/2001 | Brody | |
| 2001/0052121 A1 | 12/2001 | Masuda et al. | |
| 2001/0054004 A1 | 12/2001 | Powers | |
| 2001/0056411 A1 | 12/2001 | Lindskog et al. | |
| 2001/0056429 A1 | 12/2001 | Moore et al. | |
| 2001/0056460 A1 | 12/2001 | Sahota et al. | |
| 2002/0010700 A1 | 1/2002 | Wotring et al. | |
| 2002/0010743 A1 | 1/2002 | Ryan et al. | |
| 2002/0010746 A1 | 1/2002 | Jilk et al. | |
| 2002/0010855 A1 | 1/2002 | Reshef et al. | |
| 2002/0013788 A1 | 1/2002 | Pennell et al. | |
| 2002/0019941 A1 | 2/2002 | Chan et al. | |
| 2002/0023111 A1 | 2/2002 | Arora et al. | |
| 2002/0023113 A1 | 2/2002 | Hsing et al. | |
| 2002/0026441 A1 | 2/2002 | Kutay et al. | |
| 2002/0026461 A1 | 2/2002 | Kutay et al. | |
| 2002/0032590 A1 | 3/2002 | Anand et al. | |
| 2002/0032692 A1 | 3/2002 | Suzuki et al. | |
| 2002/0032706 A1 | 3/2002 | Perla et al. | |
| 2002/0032768 A1 | 3/2002 | Voskuil | |
| 2002/0035579 A1 | 3/2002 | Wang et al. | |
| 2002/0035581 A1 | 3/2002 | Reynar et al. | |
| 2002/0040469 A1 | 4/2002 | Pramberger | |
| 2002/0049790 A1 | 4/2002 | Ricker et al. | |
| 2002/0052769 A1 | 5/2002 | Navani et al. | |
| 2002/0053021 A1 | 5/2002 | Rice et al. | |
| 2002/0054115 A1 | 5/2002 | Mack et al. | |
| 2002/0054126 A1 | 5/2002 | Gamon | |
| 2002/0054128 A1 | 5/2002 | Lau et al. | |
| 2002/0057297 A1 | 5/2002 | Grimes et al. | |
| 2002/0065798 A1 | 5/2002 | Bostleman et al. | |
| 2002/0065847 A1 | 5/2002 | Furukawa et al. | |

| Publication No. | Date | Name | | Publication No. | Date | Name |
|---|---|---|---|---|---|---|
| 2002/0070973 A1 | 6/2002 | Croley | | 2003/0140132 A1 | 7/2003 | Champagne et al. |
| 2002/0078074 A1 | 6/2002 | Cho et al. | | 2003/0140160 A1 | 7/2003 | Raz et al. |
| 2002/0078103 A1 | 6/2002 | Gorman et al. | | 2003/0142072 A1 | 7/2003 | Lapstun et al. |
| 2002/0083145 A1 | 6/2002 | Perinpanathan | | 2003/0149934 A1 | 8/2003 | Worden |
| 2002/0083148 A1 | 6/2002 | Shaw et al. | | 2003/0154464 A1 | 8/2003 | Ullmann et al. |
| 2002/0083318 A1 | 6/2002 | Larose | | 2003/0158897 A1 | 8/2003 | Ben-Natan et al. |
| 2002/0091738 A1* | 7/2002 | Rohrabaugh et al. .......... 707/517 | | 2003/0163285 A1 | 8/2003 | Nakamura et al. |
| 2002/0099952 A1 | 7/2002 | Lambert et al. | | 2003/0167277 A1 | 9/2003 | Hejlsberg et al. |
| 2002/0100027 A1 | 7/2002 | Binding et al. | | 2003/0172113 A1* | 9/2003 | Cameron et al. ............... 709/204 |
| 2002/0107885 A1* | 8/2002 | Brooks et al. ................. 707/505 | | 2003/0182268 A1 | 9/2003 | Lal |
| 2002/0111699 A1 | 8/2002 | Melli et al. | | 2003/0182327 A1 | 9/2003 | Ramanujam et al. |
| 2002/0111932 A1* | 8/2002 | Roberge et al. ..................... 707/1 | | 2003/0187756 A1 | 10/2003 | Klivington et al. |
| 2002/0112224 A1 | 8/2002 | Cox | | 2003/0187930 A1 | 10/2003 | Ghaffar et al. |
| 2002/0129056 A1 | 9/2002 | Conant | | 2003/0188260 A1 | 10/2003 | Jensen et al. |
| 2002/0133484 A1 | 9/2002 | Chau et al. | | 2003/0189593 A1 | 10/2003 | Yarvin |
| 2002/0147726 A1 | 10/2002 | Yehia et al. | | 2003/0192008 A1 | 10/2003 | Lee |
| 2002/0147748 A1 | 10/2002 | Huang et al. | | 2003/0200506 A1 | 10/2003 | Abe et al. |
| 2002/0152222 A1 | 10/2002 | Holbrook | | 2003/0204481 A1 | 10/2003 | Lau |
| 2002/0152244 A1 | 10/2002 | Dean et al. | | 2003/0204511 A1 | 10/2003 | Brundage |
| 2002/0156772 A1 | 10/2002 | Chau et al. | | 2003/0204814 A1 | 10/2003 | Elo et al. |
| 2002/0156846 A1 | 10/2002 | Rawat et al. | | 2003/0205615 A1 | 11/2003 | Marappan |
| 2002/0156929 A1 | 10/2002 | Hekmatpour | | 2003/0210428 A1 | 11/2003 | Bevlin et al. |
| 2002/0169752 A1 | 11/2002 | Kusama et al. | | 2003/0212664 A1 | 11/2003 | Breining et al. |
| 2002/0169789 A1 | 11/2002 | Kutay et al. | | 2003/0212902 A1 | 11/2003 | van der Made |
| 2002/0174147 A1 | 11/2002 | Wang et al. | | 2003/0212988 A1 | 11/2003 | Tsai et al. |
| 2002/0174417 A1 | 11/2002 | Sijacic et al. | | 2003/0217053 A1 | 11/2003 | Bachman et al. |
| 2002/0178187 A1 | 11/2002 | Rasmussen et al. | | 2003/0218620 A1* | 11/2003 | Lai et al. ....................... 345/670 |
| 2002/0178380 A1 | 11/2002 | Wolf et al. | | 2003/0220930 A1 | 11/2003 | Milleker et al. |
| 2002/0184188 A1* | 12/2002 | Mandyam et al. .................. 707/1 | | 2003/0225469 A1 | 12/2003 | DeRemer et al. |
| 2002/0184213 A1 | 12/2002 | Lau et al. | | 2003/0225768 A1 | 12/2003 | Chaudhuri et al. |
| 2002/0184219 A1 | 12/2002 | Preisig et al. | | 2003/0225829 A1 | 12/2003 | Pena et al. |
| 2002/0184401 A1 | 12/2002 | Kadel, Jr. et al. | | 2003/0226111 A1 | 12/2003 | Wirts et al. |
| 2002/0184485 A1 | 12/2002 | Dray et al. | | 2003/0226132 A1 | 12/2003 | Tondreau et al. |
| 2002/0188597 A1 | 12/2002 | Kern et al. | | 2003/0233374 A1 | 12/2003 | Spinola et al. |
| 2002/0188613 A1 | 12/2002 | Chakraborty et al. | | 2003/0233644 A1 | 12/2003 | Cohen et al. |
| 2002/0194219 A1* | 12/2002 | Bradley et al. ................. 707/506 | | 2003/0236859 A1 | 12/2003 | Vaschillo et al. |
| 2002/0196281 A1 | 12/2002 | Audleman et al. | | 2003/0236903 A1 | 12/2003 | Piotrowski |
| 2002/0196288 A1 | 12/2002 | Emrani | | 2003/0237046 A1 | 12/2003 | Parker et al. |
| 2002/0198891 A1 | 12/2002 | Li et al. | | 2003/0237047 A1 | 12/2003 | Borson |
| 2002/0198935 A1 | 12/2002 | Crandall, Sr. et al. | | 2004/0002939 A1 | 1/2004 | Arora et al. |
| 2003/0004951 A1 | 1/2003 | Chokshi | | 2004/0002950 A1 | 1/2004 | Brennan et al. |
| 2003/0007000 A1 | 1/2003 | Carlson et al. | | 2004/0003031 A1 | 1/2004 | Brown et al. |
| 2003/0014397 A1 | 1/2003 | Chau et al. | | 2004/0003341 A1 | 1/2004 | alSafadi et al. |
| 2003/0018668 A1 | 1/2003 | Britton et al. | | 2004/0003353 A1 | 1/2004 | Rivera et al. |
| 2003/0020746 A1 | 1/2003 | Chen et al. | | 2004/0003389 A1 | 1/2004 | Reynar et al. |
| 2003/0023641 A1 | 1/2003 | Gorman et al. | | 2004/0006744 A1 | 1/2004 | Jones et al. |
| 2003/0025693 A1 | 2/2003 | Haley | | 2004/0010752 A1 | 1/2004 | Chan et al. |
| 2003/0025732 A1 | 2/2003 | Prichard | | 2004/0010753 A1 | 1/2004 | Salter et al. |
| 2003/0026507 A1 | 2/2003 | Zlotnick | | 2004/0015778 A1 | 1/2004 | Britton et al. |
| 2003/0028550 A1 | 2/2003 | Lee et al. | | 2004/0015783 A1 | 1/2004 | Lennon et al. |
| 2003/0029911 A1 | 2/2003 | Kitayama | | 2004/0024842 A1 | 2/2004 | Witt |
| 2003/0033037 A1 | 2/2003 | Yuen et al. | | 2004/0030991 A1 | 2/2004 | Hepworth et al. |
| 2003/0037021 A1* | 2/2003 | Krothappalli et al. ............. 707/1 | | 2004/0039881 A1 | 2/2004 | Shoebridge et al. |
| 2003/0037303 A1 | 2/2003 | Bodlaender et al. | | 2004/0039990 A1 | 2/2004 | Bakar et al. |
| 2003/0038788 A1 | 2/2003 | Demartines et al. | | 2004/0039993 A1 | 2/2004 | Kougiouris et al. |
| 2003/0038846 A1 | 2/2003 | Hori et al. | | 2004/0044961 A1 | 3/2004 | Pesenson |
| 2003/0043986 A1 | 3/2003 | Creamer et al. | | 2004/0044965 A1 | 3/2004 | Toyama et al. |
| 2003/0046665 A1 | 3/2003 | Ilin | | 2004/0046787 A1 | 3/2004 | Henry et al. |
| 2003/0048301 A1 | 3/2003 | Menninger | | 2004/0046789 A1 | 3/2004 | Inanoria |
| 2003/0051243 A1 | 3/2003 | Lemmons et al. | | 2004/0054966 A1 | 3/2004 | Busch et al. |
| 2003/0055811 A1 | 3/2003 | Stork et al. | | 2004/0059754 A1 | 3/2004 | Barghout et al. |
| 2003/0055828 A1 | 3/2003 | Koch et al. | | 2004/0073565 A1 | 4/2004 | Kaufman et al. |
| 2003/0056198 A1 | 3/2003 | Al-Azzawe et al. | | 2004/0073868 A1 | 4/2004 | Easter et al. |
| 2003/0058286 A1 | 3/2003 | Dando | | 2004/0078756 A1 | 4/2004 | Napper et al. |
| 2003/0061386 A1 | 3/2003 | Brown et al. | | 2004/0083426 A1 | 4/2004 | Sahu |
| 2003/0061567 A1 | 3/2003 | Brown et al. | | 2004/0088647 A1 | 5/2004 | Miller et al. |
| 2003/0069881 A1* | 4/2003 | Huttunen ............................ 707/5 | | 2004/0088652 A1 | 5/2004 | Abe et al. |
| 2003/0074279 A1 | 4/2003 | Viswanath | | 2004/0093596 A1 | 5/2004 | Koyano |
| 2003/0084424 A1 | 5/2003 | Reddy et al. | | 2004/0107367 A1 | 6/2004 | Kisters |
| 2003/0093755 A1 | 5/2003 | O'Carroll | | 2004/0117769 A1 | 6/2004 | Lauzon et al. |
| 2003/0110443 A1 | 6/2003 | Yankovich et al. | | 2004/0123277 A1 | 6/2004 | Schrader et al. |
| 2003/0120578 A1 | 6/2003 | Newman | | 2004/0128296 A1 | 7/2004 | Krishnamurthy et al. |
| 2003/0120651 A1 | 6/2003 | Bernstein et al. | | 2004/0139400 A1* | 7/2004 | Allam et al. ................... 715/526 |
| 2003/0120659 A1 | 6/2003 | Sridhar | | 2004/0146199 A1 | 7/2004 | Berkner et al. |
| 2003/0120671 A1 | 6/2003 | Kim et al. | | 2004/0148178 A1 | 7/2004 | Brain |
| 2003/0120686 A1 | 6/2003 | Kim et al. | | 2004/0148514 A1 | 7/2004 | Fee et al. |
| 2003/0126555 A1 | 7/2003 | Aggarwal et al. | | 2004/0148571 A1* | 7/2004 | Lue ................................. 715/514 |
| 2003/0128196 A1 | 7/2003 | Lapstun et al. | | 2004/0162741 A1 | 8/2004 | Flaxer et al. |
| 2003/0135825 A1 | 7/2003 | Gertner et al. | | 2004/0163041 A1 | 8/2004 | Engel |

| | | | | | | |
|---|---|---|---|---|---|---|
| 2004/0163046 A1* | 8/2004 | Chu et al. ............... 715/517 | 2005/0240876 A1 | 10/2005 | Myers et al. | |
| 2004/0172442 A1 | 9/2004 | Ripley | 2005/0246304 A1 | 11/2005 | Knight et al. | |
| 2004/0181543 A1 | 9/2004 | Wu et al. | 2005/0256933 A1* | 11/2005 | Millington et al. ........... 709/207 | |
| 2004/0181711 A1 | 9/2004 | Johnson et al. | 2005/0257148 A1 | 11/2005 | Goodman et al. | |
| 2004/0186762 A1 | 9/2004 | Beaven et al. | 2005/0262112 A1 | 11/2005 | Moore | |
| 2004/0189708 A1 | 9/2004 | Larcheveque et al. | 2005/0268217 A1 | 12/2005 | Garrison | |
| 2004/0189716 A1 | 9/2004 | Paoli et al. | 2005/0268222 A1 | 12/2005 | Cheng | |
| 2004/0194035 A1 | 9/2004 | Chakraborty | 2006/0004910 A1* | 1/2006 | Burd et al. ............... 709/203 | |
| 2004/0196266 A1 | 10/2004 | Matsuura et al. | 2006/0010386 A1* | 1/2006 | Khan ..................... 715/728 | |
| 2004/0199572 A1 | 10/2004 | Hunt et al. | 2006/0020586 A1 | 1/2006 | Prompt et al. | |
| 2004/0205473 A1 | 10/2004 | Fisher et al. | 2006/0020883 A1* | 1/2006 | Kothari et al. ............. 715/513 | |
| 2004/0205525 A1 | 10/2004 | Murren et al. | 2006/0026500 A1 | 2/2006 | Qa | |
| 2004/0205534 A1 | 10/2004 | Koelle | 2006/0026534 A1 | 2/2006 | Ruthfield et al. | |
| 2004/0205571 A1 | 10/2004 | Adler et al. | 2006/0031757 A9 | 2/2006 | Vincent, III | |
| 2004/0205592 A1 | 10/2004 | Huang | 2006/0036995 A1 | 2/2006 | Chickles et al. | |
| 2004/0205605 A1 | 10/2004 | Adler et al. | 2006/0041593 A1* | 2/2006 | Borthakur et al. ........... 707/200 | |
| 2004/0205644 A1 | 10/2004 | Shaughnessy et al. | 2006/0041838 A1 | 2/2006 | Khan | |
| 2004/0205653 A1 | 10/2004 | Hadfield et al. | 2006/0059107 A1 | 3/2006 | Elmore et al. | |
| 2004/0205671 A1 | 10/2004 | Sukehiro et al. | 2006/0059434 A1 | 3/2006 | Boss et al. | |
| 2004/0210599 A1 | 10/2004 | Friedman et al. | 2006/0069605 A1 | 3/2006 | Hatoun | |
| 2004/0210645 A1 | 10/2004 | Kouznetsov et al. | 2006/0069985 A1 | 3/2006 | Friedman et al. | |
| 2004/0216084 A1 | 10/2004 | Brown et al. | 2006/0074981 A1* | 4/2006 | Mauceri et al. ............ 707/104.1 | |
| 2004/0221238 A1 | 11/2004 | Cifra et al. | 2006/0075245 A1 | 4/2006 | Meier | |
| 2004/0221245 A1 | 11/2004 | Chickles et al. | 2006/0080657 A1 | 4/2006 | Goodman | |
| 2004/0237030 A1 | 11/2004 | Malkin | 2006/0085409 A1 | 4/2006 | Rys et al. | |
| 2004/0260593 A1 | 12/2004 | Abraham-Fuchs et al. | 2006/0101037 A1 | 5/2006 | Brill et al. | |
| 2004/0261019 A1 | 12/2004 | Imamura et al. | 2006/0101051 A1 | 5/2006 | Carr et al. | |
| 2004/0261032 A1* | 12/2004 | Olander et al. ............... 715/747 | 2006/0107206 A1 | 5/2006 | Koskimies | |
| 2004/0268229 A1* | 12/2004 | Paoli et al. ................. 715/508 | 2006/0129583 A1 | 6/2006 | Catorcini et al. | |
| 2004/0268259 A1 | 12/2004 | Rockey et al. | 2006/0129978 A1 | 6/2006 | Abrari et al. | |
| 2004/0268260 A1 | 12/2004 | Rockey et al. | 2006/0136422 A1 | 6/2006 | Matveief et al. | |
| 2005/0004893 A1 | 1/2005 | Sangroniz | 2006/0143220 A1 | 6/2006 | Spencer | |
| 2005/0005248 A1 | 1/2005 | Rockey et al. | 2006/0155857 A1 | 7/2006 | Feenan et al. | |
| 2005/0015279 A1 | 1/2005 | Rucker | 2006/0161559 A1 | 7/2006 | Bordawekar et al. | |
| 2005/0015732 A1 | 1/2005 | Vedula et al. | 2006/0161837 A1 | 7/2006 | Kelkar et al. | |
| 2005/0022115 A1 | 1/2005 | Baumgartner et al. | 2006/0173865 A1 | 8/2006 | Fong | |
| 2005/0027757 A1 | 2/2005 | Kiessig et al. | 2006/0184393 A1* | 8/2006 | Ewin et al. ............... 705/2 | |
| 2005/0028073 A1 | 2/2005 | Henry et al. | 2006/0191662 A1 | 8/2006 | Deibl et al. | |
| 2005/0033728 A1 | 2/2005 | James | 2006/0195413 A1 | 8/2006 | Davis et al. | |
| 2005/0038711 A1 | 2/2005 | Marlelo | 2006/0200754 A1 | 9/2006 | Kablesh et al. | |
| 2005/0050066 A1 | 3/2005 | Hughes | 2006/0203081 A1 | 9/2006 | Pulitzer | |
| 2005/0055627 A1 | 3/2005 | Lloyd et al. | 2006/0230363 A1 | 10/2006 | Rapp | |
| 2005/0060324 A1 | 3/2005 | Johnson et al. | 2006/0248468 A1* | 11/2006 | Constantine et al. ......... 715/747 | |
| 2005/0060647 A1 | 3/2005 | Doan et al. | 2006/0271839 A1* | 11/2006 | Gottlieb et al. ............. 715/501.1 | |
| 2005/0060721 A1 | 3/2005 | Choudhary et al. | 2007/0005611 A1 | 1/2007 | Takasugi et al. | |
| 2005/0065933 A1 | 3/2005 | Goering | 2007/0036433 A1 | 2/2007 | Teutsch | |
| 2005/0065936 A1 | 3/2005 | Goering | 2007/0050719 A1 | 3/2007 | Lui et al. | |
| 2005/0066287 A1 | 3/2005 | Tattrie et al. | 2007/0061467 A1 | 3/2007 | Essey | |
| 2005/0071752 A1 | 3/2005 | Marlatt | 2007/0061706 A1 | 3/2007 | Cupala | |
| 2005/0076022 A1 | 4/2005 | Wu et al. | 2007/0074106 A1 | 3/2007 | Ardeleanu | |
| 2005/0076049 A1 | 4/2005 | Qubti et al. | 2007/0088554 A1 | 4/2007 | Harb et al. | |
| 2005/0080801 A1 | 4/2005 | Kothandaraman et al. | 2007/0094589 A1* | 4/2007 | Paoli et al. ............... 715/506 | |
| 2005/0091285 A1 | 4/2005 | Krishnan et al. | 2007/0100877 A1 | 5/2007 | Paoli | |
| 2005/0091305 A1 | 4/2005 | Lange et al. | 2007/0100967 A1* | 5/2007 | Smith et al. .............. 709/219 | |
| 2005/0097536 A1 | 5/2005 | Bernstein et al. | 2007/0101280 A1 | 5/2007 | Paoli | |
| 2005/0102370 A1 | 5/2005 | Lin et al. | 2007/0118538 A1 | 5/2007 | Ahern et al. | |
| 2005/0102612 A1* | 5/2005 | Allan et al. ................. 715/513 | 2007/0118803 A1 | 5/2007 | Walker et al. | |
| 2005/0108624 A1 | 5/2005 | Carrier | 2007/0130500 A1* | 6/2007 | Rivers-Moore et al. ... 715/501.1 | |
| 2005/0114757 A1 | 5/2005 | Sahota et al. | 2007/0130504 A1 | 6/2007 | Betancourt et al. | |
| 2005/0114764 A1 | 5/2005 | Gudenkauf et al. | 2007/0186157 A1 | 8/2007 | Walker et al. | |
| 2005/0132043 A1 | 6/2005 | Wang et al. | 2007/0208606 A1 | 9/2007 | MacKay et al. | |
| 2005/0132196 A1 | 6/2005 | Dietl | 2007/0208769 A1 | 9/2007 | Boehm et al. | |
| 2005/0138031 A1 | 6/2005 | Wefers | 2007/0276768 A1 | 11/2007 | Pallante | |
| 2005/0138086 A1 | 6/2005 | Pecht-Seibert | 2008/0021916 A1 | 1/2008 | Schnelle et al. | |
| 2005/0138539 A1 | 6/2005 | Bravery et al. | 2008/0027896 A1 | 1/2008 | Anjur | |
| 2005/0149375 A1 | 7/2005 | Wefers | 2008/0028340 A1 | 1/2008 | Davis | |
| 2005/0149726 A1 | 7/2005 | Joshi et al. | 2008/0040635 A1 | 2/2008 | Larcheveque | |
| 2005/0159136 A1* | 7/2005 | Rouse et al. ............... 455/412.1 | 2008/0052287 A1 | 2/2008 | Stanciu et al. | |
| 2005/0160398 A1 | 7/2005 | Bjornson et al. | 2008/0126402 A1 | 5/2008 | Sitchi et al. | |
| 2005/0171746 A1 | 8/2005 | Thalhammer-Reyero | 2008/0134162 A1 | 6/2008 | James | |
| 2005/0183006 A1 | 8/2005 | Rivers-Moore et al. | 2008/0162498 A1 | 7/2008 | Omoigui | |
| 2005/0198086 A1 | 9/2005 | Moore et al. | 2008/0189335 A1 | 8/2008 | Sikchi et al. | |
| 2005/0198125 A1 | 9/2005 | Beck et al. | 2008/0222514 A1 | 9/2008 | Rivers-Moore | |
| 2005/0198247 A1 | 9/2005 | Perry et al. | 2009/0044103 A1 | 2/2009 | Chalecki et al. | |
| 2005/0210263 A1 | 9/2005 | Levas et al. | 2009/0070411 A1* | 3/2009 | Chang et al. ............... 709/203 | |
| 2005/0223063 A1 | 10/2005 | Chang et al. | 2009/0119580 A1* | 5/2009 | Rohrabaugh et al. ......... 715/249 | |
| 2005/0223320 A1 | 10/2005 | Brintzenhofe et al. | 2009/0138389 A1 | 5/2009 | Barthel | |
| 2005/0234890 A1 | 10/2005 | Enzler et al. | | | | |
| 2005/0240620 A1* | 10/2005 | Danner et al. ............... 707/102 | | | | |

| | | |
|---|---|---|
| 2009/0177961 | A1 | 7/2009 Fortini |
| 2010/0125778 | A1 | 5/2010 Kelkar et al. |
| 2010/0229110 | A1 | 9/2010 Rockey et al. |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 08263246 | 10/1996 |
| JP | 08263247 | 10/1996 |
| JP | 09016801 | 1/1997 |
| JP | 09134273 | 5/1997 |
| JP | 09190327 | 7/1997 |
| JP | 09251370 | 9/1997 |
| JP | 09292967 | 11/1997 |
| JP | 10011255 | 1/1998 |
| JP | 10097559 | 4/1998 |
| JP | 10171662 | 6/1998 |
| JP | 10207805 | 8/1998 |
| JP | 10232754 | 9/1998 |
| JP | 10240434 | 9/1998 |
| JP | 10260765 | 9/1998 |
| JP | 2000132436 | 5/2000 |
| JP | 2002183652 | 6/2002 |
| JP | 2003173288 | 6/2003 |
| JP | 200329635 | 10/2003 |
| RU | 2413987 | 3/2011 |
| WO | WO-9924945 | 5/1999 |
| WO | WO-9956207 | 11/1999 |
| WO | WO-0144934 | 6/2001 |
| WO | WO0157720 | 9/2006 |

OTHER PUBLICATIONS

Douglas J. Reilly, "Programming Microsoft Web Forms", Nov. 2, 2005, Microsoft Press, ISBN- 13:978-0-7356-2179-4, URL:<http://academic.safaribooksonline.com/print?xmlid=0735621799/systemdotwebdotuidotweb>.*
"Microsoft Word 2000 Screenshots", (2000),11-17.
XmlSpy, "XmlSpy 2004 Enterprise Edition Manual", Altova,(May 17, 2004),1-25, 220-225.
StylusStudio, "StylusStudio: XPath Tools", 2004-2007, Stylus-Studio,1-14.
Dodds, "Toward an XPath API", xml.com,(May 7, 2001),1-3.
Altova, "Altova Tools for XPath 1.0/2.0", Altova,1-12.
"Microsoft Word 2000 Screenshots", Word,(2000),1-17.
Pacheco, Xavier et al.,"Delphi 5 Developer's Guide", Sams Publishing. Chapter 31, Section: Data Streaming,(1999),4.
"Non Final OA", U.S. Appl. No. 10/939,588, (Feb. 18, 2009),40 pages.
"Notice of Allowance", U.S. Appl. No. 10/404,312, (Jan. 12, 2009),12 pages.
"Final Office Action", U.S. Appl. No. 10/857,689, (Jan. 6, 2009),23 pages.
"Non Final Office Action", U.S. Appl. No. 10/977,198, (Feb. 2, 2009),15 pages.
"Non Final Office Action", U.S. Appl. No. 10/939,588, (Feb. 18, 2009),40 pages.
"Non Final Office Action", U.S. Appl. No. 10/976,451, (Feb. 23, 2009),39 pages.
"Non final Office Action", U.S. Appl. No. 11/234,767, (Feb. 26, 2009),37 pages.
"Notice of Allowance", U.S. Appl. No. 11/167,514, (Mar. 11, 2009),6 pages.
"Non Final Office Action", U.S. Appl. No. 10/942,528, (Mar. 6, 2009),31 pages.
"Non Final Offfice Action", U.S. Appl. No. 11/170,521, (Jan. 21, 2009),86 pages.
"Foreign Office Action", Application Serial No. 2 412 611 (Feb. 9, 2009),6 pages.
"Foreign Office Action", Application Serial No. 200610003709.2, (Jan. 9, 2009),8 pages.
"EP Office Action", Application Serial No. 06111546.5, (Oct. 15, 2008),5 pages.
"Notice of Re-Examination", Application Serial No. 01813138.7, (Mar. 11, 2009),27 pages.
"Notice of Allowance", U.S. Appl. No. 10/988,718, (Apr. 9, 2009).
"Final Office Action", U.S. Appl. No. 11/107,347, (Apr. 2, 2009),15 pages.
"Restriction Requirement", U.S. Appl. No. 11/227,550, (Apr. 2, 2009),8 pages.
"Non Final Office Action", U.S. Appl. No. 10/955,665, (Apr. 2, 2009),19 pages.
"Non Final Office Action", U.S. Appl. No. 10/988,720, 19 pages.
"Final Office Action", U.S. Appl. No. 11/203,818, (Apr. 14, 2009),31 pages.
"Final Office Action", U.S. Appl. No. 11/044,106, (Apr. 13, 2009),20 pages.
"Final Office Action", U.S. Appl. No. 11/226,044, (Apr. 20, 2009),24 pages.
"Final Office Action", U.S. Appl. No. 11/056,500, (Apr. 16, 2009),10 pages.
Bradley, Neil "The XML Companion, Third Edition", *Published by Addison Wesley Professional*, http://proquest.safaribooksonline.com0201770598, http,(Dec. 12, 2001),1-18.
Klarlund, Nils "DSD: A Schema Language for XML", *ACM, FSMP Portland Oregon*, (2000),101-111.
Watt, Andrew "MIcrosoft Office Infopath 2003 Kick Start", (*Published by Sams*) Print ISBN-10:0-672-32623-X, (Mar. 24, 2004),1-57.
"Enter Key", Retrieved from the Internet at http://systems.webopedia.com/TERM/Enter_key.html on Dec. 20, 2006.
"Microsoft Visual Basic 5.0 Programmers Guide", Microsoft Press,.
"Microsoft Word 2000", Screenshots,(1999),1-5.
Beauchemin, Dave , "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Borland, Russo , "Running Microsoft Word 97", 314-315, 338, 361-362, 390, and 714-719.
Brabrand, et al., "Power Forms Declarative Client-side Form Field Validation", (2002),1-20.
Dubinko, Micah , "XForms and Microsoft InfoPath", Retrieved from the Internet at http://www.xml.com/lpt/a/1311 on Jan. 21, 2007,(Oct. 29, 2003).
Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Lehtonen, Miro , et al., "A Dynamic User Interface for Document Assembly", Department of Computer Science, University of Helsinki,(Nov. 2002).
Nelson, Joe , "Client-side Form Validation Using JavaScript", *Developer Advisory*, (Sep. 21, 2001).
Raman, T. V., et al., "XForms 1.0", (Dec. 2001),Section 1-12.2.3 & Appendices A-G.
Rees, Michael J., "Evolving the Browser Towards a Standard User Interface Architecture", School of Information Technology, Bond University, Australia,(2001).
Singh, Darshan , "Microsoft InfoPath 2003 By Example", Retrieved from the Internet at http://www.perfectxml.com/InfoPath.asp on Jan. 21, 2007,(Apr. 20, 2003).
Udell, Jon , "InfoPath and XForms", Retrieved from the Internet at http://webloginfoworld.com/udell/2003/02/26.html,(Feb. 26, 2003).

Altova, Inc., "XML Spy 4.0 Manual," Altova Inc. & Altova GmbH, coyright 1998-2001, Chapters 1, 2, and 6, encompassing pp. 1-17, 18-90, and 343-362.

Cybook, Inc. "Copying the Search Form to Services-based Web Sites" INternet Article, (online) Jul. 26, 2004.*the whole document*.

Macromedia, Inc.: "Dreamweaver Technote, Changes in copying and pasting in Dreamweaver 4" Internet Article (online). *the whole document*.

Redo, Dave: "How to create a template that makes it easy for users to "fill in the blanks", without doing any programming" Microsoft Word MVP FAQ Site, (online) Apr. 30, 2004, the whole document.

Hu, et al., "A Programmable Editor for Developing Structured Documents based on Bidirectional Transformations", ACM,(Aug. 2004),178-179.

Anat, Eyal et al., "Integrating and Customizing Hererogeneous E-Commerce Applications", The VLDB Journal—The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginners Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,(May 2002),25 pages.

Cover, XML Forms Architecture, retrieved at <<http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.homuns.edu.vn/WebLib/booksWeb/Tel/htmI3-tables.html>>, W3C Internet Draft, Jul. 7, 1995, pp. 1-12.

Altova, et al., "User and Reference Manual Version 4.4", www.xmlspy.com, (May 24, 2007),1-565.

"XForm 1.0", W3C,(Jul. 16, 2001).

Grosso, et al., "XML Fragment Interchange", W3C,(Feb. 2001),1-28.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.

"Webopedia Computer Dictionary" retrieved on May 9, 2006, at <<http://www.pewebopedia.com/TERM/O/OLE.html>>, Jupitermedia Corporation, 2006, pp. 7.

Kay, Michael "XSL Transfornmations (XSLT) Version 2.0", http://www.w3.org/TR/2005/WD-xsIt20-20050404. (04/205),1-374.

Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999),182 pages.

Acklen, et al., "Special Edition, Using Corel WordPerfect 9", Que Corporation,,(Jun. 1999),pp. 251-284, 424-434, 583-585.

"Final Office Action", U.S. Appl. No. 11/203,937, (May 7, 2009),13 pages.

"Non Final Office Action", U.S. Appl. No. 10/955,666, (May 7, 2009),28 pages.

"Non Final Office Action", U.S. Appl. No. 10/876,433, (Apr. 24, 2009),62 pages.

"Non Final Office Action", U.S. Appl. No. 10/916,692, (Apr. 30, 2009),14 pages.

"HP Blade Server BH Series Operating System Guide", Hewlett-Packard,(Jul. 2002).

"Non Final Office Action", U.S. Appl. No. 09/599,809, (May 13, 2009),25 pages.

"Non Final Office Action", U.S. Appl. No. 10/990,152, (May 28, 2009),19 pages.

"Non-Final Office Action", U.S. Appl. No. 11/036,910, (Jun. 1, 2009),15 pages.

"Non Final Office Action", U.S. Appl. No. 10/857,689, (Jun. 11, 2009),25 pages.

"Non Final Office Action", U.S. Appl. No. 11/095,254, (Jun. 8, 2009),21 pages.

"Final Office Action", U.S. Appl. No. 11/234,767, (Jun. 10, 2009),24 pages.

"Foreign Office Action", Application Serial No. 2002-503702, Final Notice of Rejection,(Jun. 5, 2009),212 pages.

"Final Office Action", U.S. Appl. No. 10/976,451 (Jul. 2, 2009), (May 4, 2006),22 pages.

Reagan, Moore W., et al., "Collection-based persistent digital archives", U.S. Appl. No. 60/191,662, filed Mar. 23, 2000, 133.

"Non-Final Office Action", U.S. Appl. No. 11/227,550, (Aug. 3, 2009), 45 pages.

"Notice of Allowance", U.S. Appl. No. 11/203,937, (Aug. 3, 2009),107 pages.

"Non-Final Office Action", U.S. Appl. No. 11/234,767, (Feb. 2, 2006), 150 Pages.

"Non-Final Office Action", U.S. Appl. No. 11/234,767, (Aug. 12, 2009),150 pages.

"Non-Final Office Action", U.S. Appl. No. 10/939,588, (Aug. 27, 2009),28 pages.

"Final Office Action", U.S. Appl. No. 11/170,521, (Sep. 8, 2009),12 pages.

"Final Office Action", U.S. Appl. No. 10/402,640, (Aug. 28, 2009),17 pages.

"Notice of Allowance", U.S. Appl. No. 11/203,937, Supplemental,(Sep. 15, 2009),2 pages.

"Final Office Action", U.S. Appl. No. 10/942,528, (Sep. 17, 2009),27 pages.

"Non-Final Office Action", U.S. Appl. No. 11/107,347, (Sep. 17, 2009),9 pages.

"Notice of Allowance", U.S. Appl. No. 10/988,720, (Sep. 17, 2009),18 pages.

"Non-Final Office Action", U.S. Appl. No. 11/044,106, (Sep. 24, 2009),17 pages.

"Notice of Allowance", U.S. Appl. No. 11/203,937, (Aug. 31, 2009),2 pages.

"Non-Final Office Action", U.S. Appl. No. 11/567,149, (Sep. 8, 2009),5 pages.

"Final Office Action", U.S. Appl. No. 10/955,666, (Oct. 14, 2009),24 pages.

"Advisory Action", U.S. Appl. No. 10/942,528, (Oct. 26, 2009),3 pages.

"Non-Final Office Action", U.S. Appl. No. 11/557,931, (Oct. 20, 2009),27 pages.

"Non-Final Office Action", U.S. Appl. No. 10/976,451, (Oct. 29, 2009),14 pages.

Webopedia, "Definition of OLE", Retrieved from: <http://www.webopedia.com/TERM/O/OLE.html>, cited by examiner,(May 16, 1998),3 pages.

Webopedia, "Definition of OpenDoc", Retrieved from: <http://www.webopedia.com/TERM/O/OpenDoc.html>, cited by examiner,(Sep. 18, 1997),3 pages.

Webopedia, "Definition of Network", Retrieved from: <http://www.webopedia.com/TERM/n/network.html>, cited by examiner,(Sep. 1, 1996),2 pages.

"Final Office Action", U.S. Appl. No. 10/916,692, filed Nov. 16, 2009, 10 pages.

"Final Office Action", U.S. Appl. No. 11/072,087, filed Nov. 16, 2009, 9 pages.

"Final Office Action", U.S. Appl. No. 11/218,149, filed Nov. 16, 2009, 18 pages.

"Foreign Office Action", Mexican Patent Application No. Pa/a/2006/002493 Sep. 14, 2009, 5 pages.

"Non-Final Office Action", U.S. Appl. No. 11/036,910, filed Nov. 13, 2009, 9 pages.

"Notice of Allowance", U.S. Appl. No. 10/942,528, filed Dec. 3, 2009, 8 pages.

"Notice of Allowance", U.S. Appl. No. 10/955,665, filed Nov. 3, 2009, 8 pages.

"Notice of Allowance", U.S. Appl. No. 11/095,254, filed Nov. 18, 2009, 8 pages.

Van Hoff, Arthur et al., "The Open Software Description Format", Retrieved from: <www.w3.org/TR/NOTE-OSD> on May 18, 2009 Aug. 13, 1997, 10 pages.

"Architecture for a Dynamic Information Area Control", IBM Technical Disclosure Bulletin, IBM Corp, NY, US vol. 37, No. 10, Jan. 10, 1994,pp. 245-246.

"Excel Developer Tip: Determining the Data Type of a Cell", Retrieved from <http://jwalk.com/ss/excel/tips/tip62.htm>, (May 13, 1998),1 page.

"Netscape Communicator 4.61 for OS/2 Warp", Netscape Communication Corporation, Software 1999, The Whole software release & Netscape—Version 4.61 {en}—010615, Netscape Screenshot,(Oct. 2, 2002),1 page.

"OMG XML Metadata Interchange (XMI) Specification", Retrieved from: <http://www.omg.org/cgi-bin/doc?formal/02-01-01.pdf> on Dec. 2, 2009, Version 1.2,(Jan. 2002), 268 pages.

"SmartUpdate Developer's Guide", Retrieved from http://developer.netscapte.com:80/docs/manuals/communicator/jarman/index.htm on Dec. 8, 2000, Netscape Communications Corp,(Mar. 11, 1999), 83 pages.

"Streamlining Content Creation", Ixia Soft Jun. 6, 2002,pp. 1-16.

"Validation with MSXML and XML Schema", *Windows Developer Magazine*, (Jan. 1, 2002),5 pages.

"Whitehill Composer Software product", Retrieved from www.sml.com/pub/p/221 on Apr. 8, 2004, Whitehill Technologies, Inc.,(Apr. 8, 2004),2 pages.

Alschuler, Liora "A Tour of XMetal", Retrieved from: <http://www.xml.com/pub/a/SeyboldReport/ip031102.html>on Feb. 5, 2003, XML.com, Online! XPOO2230081,(Jul. 14, 1999), 3 pages.

Altova, et al., "XML Spy, XML Integrated Development Environments", Altova Inc.,(2002),pp. 1-18.

Au, Irene et al., "Netscape Communicator's Collapsible Toolbars", CHI 98, Human Factors in Computing Systems, Conference Proceedings, LA, CA,(Apr. 18-23, 1998),pp. 81-86.

Barker, et al., "Creating In-Line Objects Within An Integrated Editing Environment", IBM Technical Disclosure Bulletin, vol. 27, No. 5,(Oct. 1984),p. 2962.

Battle, Steven A., et al., "Flexible Information Presentation with XML", *The Institution of Electrical Engineers*, (1998),6 pages.

Ben-Natan, Ron et al., "Internet Platform for Creating and Supporting Communities", U.S. Appl. No. 60/203,081, Filed May 9, 2000, 31 pages.

Berg, A "Naming and Binding: Monikers", *Inside OLE, Chapter 9, Harmony Books*, (1995),pp. 431-490.

Brogden, William "Arbortext Adept 8 Editor Review", Retrieved from: <www.xml.com/pub/a/1999/09/adept/AdeptRvw.htm> on Feb. 5, 2003, O'Reilly XML.com, Online!,(Sep. 22, 1999),4 pages.

Chen, Ya B., et al., "Designing Valid XML Views", S. Spaccapietra, S.T. Mar., and Y. Kambayashi (Eds.): ER 2002, LNCS 2503, Copyright: Springer-Verlag Berlin Heidelberg 2002,(2002),pp. 463-477.

Chen, Yi et al., "XKvalidator: A Constraint Validator for XML", CIKM '02 Nov. 4-9, 2002, McLean, VA, USA, Copyright 2002, ACM, ISBN 1-58113-492-04/02/0011,(Nov. 4-9, 2002),pp. 446-452.

Chien, et al., "Efficient Management of Multiversion Documents by Object Referencing", Proceedings of the 27th VLDB Conference,(2001),pp. 291-300.

Chien, Shu-Yao et al., "Efficient Schemes for Managing Multiversion XML Documents", the Vldb Journal 2002, (Dec. 19, 2002),pp. 332-353.

Chien, Shu-Yao et al., "Storing and Querying Multiversion XML Documents using Durable Node Numbers", IEEE,(2002),pp. 232-241.

Chien, Shu-Yoa et al., "XML Document Versioning", SIGMOD Record, vol. 30, No. 3(Sep. 2001),pp. 46-53.

Chuang, Tyng-Ruey "Generic Validation of Structural Content with Parametric Modules", *ICFP 2001 International Conference on Functional Programming*, vol. 36, No. 10, Available at <http://citeseerx.ist.psu.edu/viewdoc/download?doi=10.1.1.7.6412&rep=rep1&type=pdf>,(Sep. 3, 2001),12 pages.

Ciancarini, Paolo A., et al., "Managing Complex Documents Over the Www: a Case Study for XML", *Transactions on Knowledge and Data Engineering*, vol. 11, No. 4, Available at <http://citeseerx.ist.psu.edu/viewdoc/download?doi=10.1.1.18.1679&rep=rep1&type=pdf>,(Apr. 1999),pp. 1-14.

Clapp, D "The NeXT Application Kit Part 1: Non-Responsive Classes", *The NeXT Bible Chapter 16*, (1990),pp. 275-293.

Clark, James "XSL Transformation (XSLT), Version 1.0", Retrieved from: <www.w3.org/TR/1999/REC-xslt19991116> on Oct. 26, 2009, WC3,(Nov. 16, 1999),57 pages.

Clark, James et al., "XML Path Language (XPath)", Retrieved from: <www.w3.org/TR/1999/RCE-xpath-19991116> on Oct. 26, 2009, Version 1.0,(Nov. 16, 1999),37 pages.

Clark, Peter "From Small Beginnings", *Knowledge Management*, (Nov. 2001),pp. 28-30.

Davidow, Ari "XML Editors: Allegations of Functionality in Search of Reality", Retrieved from: <http://www.ivritype.com/xml/> on Feb. 9, 2009, SP002230082,(Oct. 12, 1999),16 pages.

Dayton, Linnea et al., "Photo Shop 5/5.5 WOW! Book", 2000, *Peachpit Press*, (2000),pp. 8-17.

Dilascia, Paul et al., "Sweeper", *Microsoft interactive developer*, vol. 1., No. 1, (1996),pp. 16-52.

Dorward, Sean et al., "Unix Variants", *Unix Review*, vol. 10, No. 4, (Apr. 1992),pp. 29-31.

Dyck, Timothy "XML Spy Tops as XML Editor", *eWeek*, vol. 19, No. 47 (Nov. 25, 2002),3 pages.

Fukuhara, Yasuji "Clarisworks, Introduction to Business Document Construction, No. 4, Estimate", *Nikkei Mac*, No. 14; Japan, (May 17, 1994),18 pages.

Halberg, et al., "Using Microsoft Excel 97", Que Corporation(1997),pp. 1-9, 18-25, 85-89, 98-101, 106-113, 124-127, 144-147, 190-201, 209-210, 213-227, 581-590, 632-633, 650-655, 712-714.

Han, Richard et al., "Websplitter: A Unified XML Framework for Multi-Device Collaborative Web Browsing", *ACM Conference on Computer Supported Cooperative Work*, (2000),10 pages.

Hardy, Matthew R., et al., "Mapping and Displaying Structural Transformations between XML and PDF", *Proceedings of the 2002 ACM symposium on Document engineering*, (Nov. 8-9, 2002),pp. 95-102.

Haukeland, Jan-Henrick "Tsbiff-tildeslash biff—Version 1.2.1", http://web.archive.org/web/19990912001527/http://www.tildeslash.com/tsbiff/., (Jun. 1999),2 pages.

Honkala, Mikko et al., "Multimodal Interaction with XForms", *ICWE '06*, (Nov. 14, 2006),pp. 201-208.

Hwang, Kai et al., "Micro-Firewalls for Dynamic Network Security with Distributed Intrusion Detection", *IEEE International Symposium on Network Computing and Applications 2001*, (2001),pp. 68-79.

Iwantani, Kaori et al., "Perfect Manual of Clarisworks 4.0 for Macintosh", *1st Edition*, Japan, (Jul. 22, 1997),33 pages.

Kaiya, Haruniko et al., "Specifying Runtime Environments and Functionalities of Downloadable Components under the Sandbox Model", *International Symposium on Principles of Software Evolution 2000*, (2000),pp. 138-142.

Kanemoto, Hirotaka et al., "An Efficiently Updatable Index Scheme for Structured Documents", *DEXA '98* (1998),pp. 991-996.

Kim, Sang-Kyun et al., "Immediate and Partial Validation Mechanism for the Conflict Resolution of Update Operations in XML Databases", *WAIM 2002, LNCS 2419, 2002, Springer-Verlag Berlin Heidelberg*, (2002),pp. 387-396.

Kobayashi, M. et al., "An Update on BTRON-specification OS Development", *Proceedings of the 8thTRON Project Symposium*, 1991, 0-8186-2475-2/91,(1991),pp. 132-140.

Komatsu, Naohisa et al., "A Proposal on Digital Watermark in Document Image Communication and It's Application to Realizing a Signature", *Electronics and Communication in Japan, Part I: Communications*, vol. 73, No. 5, (May 1990),pp. 22-33.

Kutay, Ali et al., "Methods and Systems for Accessing, Organizing, Presenting and Viewing Data", U.S. Appl. No. 60/209,713, Kutay et al., filed Jun. 5, 2000, 345 pages.

Leblond, et al., "PC Magazine Guide to Quattro Pro for Windows", Ziff-Davis Press,(1993),pp. 9-11, 42-61.

Mansfield, Ron "Excel 97 for Busy People", Osborne/McGraw-Hill(Jan. 27, 1997),pp. 48-50.

Matsushita, Noriko "Step-up Training of Clarisworks (Tabulation), Successful Use of Spreadsheet and Tabulation", *Mac People*, vol. 4, No. 19, (Oct. 1, 1998),5 pages.

McCright, John S., "New Tool Kit to Link Groove with Microsoft SharePoint", Retrieved from: <http://www.eweek.com/c/a/Enterprise-Applications/New-Tool-Kit-to-Link-Groove-With-Microsoft-SharePoint/> on Dec. 28, 2009, (Jul. 29, 2002),3 pages.

Musgrave, S "Networking Technology—Impact and Opportunities", *Survey and Statistical Computing 1996, Proceedings of the Second ASC International Conference*, London, UK (Sep. 1996),pp. 369-378.

Noore, Afzel "A Secure Conditional Access System using Digital Signature and Encryption", *International Conference on Consumer Electronics*, (Jun. 2003),pp. 220-221.

Pike, Rob et al., "Plan 9 From Bell Labs", AT&T Bell Laboratories, UKUGG, Summer 1990,(1990),10 pages.

Pike, Rob et al., "The Use of Name Spaces in Plan 9", *Operating Systems Review*, vol. 27, No. 2, (Apr. 1993),pp. 72-76.

Prevelakis, Vassilis et al., "Sandboxing Applications", *FREENIX Track: 2001 USENIX Annual Technical Conference*, (2001),pp. 119-126.

Rapaport, Lowell "Get More From SharePoint", *Transform Magazine*, vol. 11, No. 3, (Mar. 2002),2 pages.

Rogge, Boris et al., "Validating MPEG-21 Encapsulated Functional Metadata", *IEEE 2002*, ISBN 0-7803-7304-9/02,(2002),pp. 209-212.

Schmid, Mathew et al., "Protecting Data from Malicious Software", *18th Annual Security Applications Conference*, (2002),pp. 199-208.

Senda, Akihiro "Word 2000, Conservative—Looking but 'Attentive' New Function", NIKKEI PC 21, vol. 4, No. 8; Japan, (Aug. 1, 1999),4 pages.

Staneck, W "Internal and External Media", Electronic Publishing Unleashed, Chapter 22(1995),pp. 510-542.

Sun, Q et al., "A Robust and Secure Media Signature Scheme for JPEG Images", Proceeding of 2002 IEEE Workshop on Multimedia Signal Processing,(Dec. 2002),pp. 296-299.

Sutanthavibul, Supoj et al., "XFIG Version 3.2 Patchlevel 2 (Jul. 2, 1998) Users Manual (Edition 1.0)", Retrieved from: <www.ice.mtu.edu/online_docs/sfig332/> on Jan. 28, 2003, Internet Document XP002229137,(Jul. 2, 1998),60 pages.

Tomimori, Hiroyuki et al., "An Efficient and Flexible Access Control Framework for Java Programs in Mobile Terminals", Proceeding of 22nd Int'l Conference on Distributed Computing Systems Workshops,(2002),pp. 777-782.

Trupin, J "The Visual Programmer", Microsoft Systems Journal,(Apr. 1996),pp. 103-105.

USDIN, Tommie et al., "XML: Not a Silver Bullet, But a Great Pipe Wrench", Standard View vol. 6, No. 3, (Sep. 2, 1998),pp. 125-132.

Varlamis, Iraklis et al., "Bridging XML—Schema and relational database. A System for generating and manipulating relational databases using valid XML documents", DocEng 01, ACM 1-58113-432-0/01/0011,(Nov. 9-10, 2001),pp. 105-114.

Williams, Sara et al., "The Component Object Model: A Technical Overview", Microsoft Corp,(Oct. 1994),pp. 1-14.

Wong, Raymond K., et al., "Managing and Querying Multi-Version XML Data with Update Logging", *DocEng '02*, (Nov. 8-9, 2002),8 pages.

Zdonik, S "Object Management System Concepts", ACM,(1984),pp. 13-19.

Herzner, Wolfgang et al., "CDAM—Compound Document Access and Management. An Object-Oriented Approach", *ACM SIGOIS Bulletin*, vol. 12, Issue 1, MultiMedia Systems Interaction and Applications, Chapter 3(Jul. 1991),18 pages.

"About Microsoft Word", Microsoft Word 2000, published 1983-1999, and Microsoft Excel 2000 (see Screen Shot "About Microsoft Excel") Published 1988-1999,(Oct. 21, 2005),3 pages.

"The Search Form to Services-based Web Sites", *Cybook, Inc., the whole document*, (Jul. 26, 2004),1 page.

"Manual of Patent Office Practice", *Computer-Implemented Inventions*, Chapter 16.09.02, Data Structures, (Oct. 2010), 3 pages.

"Microsoft Computer Dictionary 5th Edition", *Entry for "Stack," Microsoft Press*, ISBN 0-7356-1495-4, (May 1, 2002), p. 495.

Sato, T. et al., "XFIG Version 3.2 Patchlevel 2 Users Manual Edition 1.0", Available at http://tinf2.vub.ac.be/~dvermeir.manuals/xfig/lib/X11/xfig/html/index.html, (Jul. 2, 1998), 37 pages.

"OLE Open Doc and Network", Retrieved from http://www.pcwebopedia.com on May 9, 2006, Webopedia entries,(May 16, 1998),7 pages.

Asche, Ruediger R., "Multithreading for Rookies", *Microsoft Developer Network Technology Group*, Retrieved Apr. 17, 2002 from http://msdn.microsoft.com/library/en-us/dndllpro/html/msdn_threads.asp?frame=true, (Sep. 24, 1993),13 pages.

Baldwin, J F., et al., "A Mass Assignment Based ID3 Algorithm for Decision Tree Introduction", *International Journal of Intelligent Systems*, vol. 12, No. 7 (1997),pp. 523-548.

Cloete, I et al., "CID3: An Extension of ID3 for Attributes with Ordered Domains", *South African Computer Journal*, vol. 4, (1991),pp. 10-16.

Kath, Randy "Managing Virtual Memory in Win32", *Microsoft Developer Network Technology Group*, Retrieved Apr. 17, 2002 from http://msdn.microsoft.comilibrary/en-us/dngenlib/html/msdn_virtmm.asp?frame=true, (Jan. 20, 1993),9 pages.

Mehta, Manish et al., "SLIQ: A Fast Scalable Classifier for Data Mining", available at <<http://www.dbis.informatik.hu-berlin.de/dbisold/lehre/WS0405/KDD/paper/MAR96.pdf>>, (Mar. 1996),15 Pages.

Sebastiani, F "A Tutorial on Automated Text Categorization", In Analia Amandi and Ricardo Zunino, editors, Proceedings of ASAI-99, *1st Argentinean Symposium on Artificial Intelligence*, Buenos Aires, AR, (1999),pp. 7-35.

Zaki, Mohammed J., et al., "Parallel Classification for Data Mining on Shared-Memory Multiprocessors", *ACM* (Mar. 1999),pp. 1-8.

Burch, Barbara "Notes R5 Technical Overview", Retrieved from: <http://www.ibm.com/developerworks/lotus/library/1s-Notes_R5_Technical_Overview> on Aug. 13, 2010, (Apr. 1, 1999),14 pages.

Howlett, Scott "A New Function for SQL Server 2000", *MSDN Magazine*, No. 1, (Apr. 18, 2000),11 pages.

"Lotus Notes Release 5, Step by Step", *Lotus Development Corporation*, (1999),224 pages.

"Final Office Action", U.S. Appl. No. 12/061,613, (Apr. 28, 2011),11 pages.

"Foreign Office Action", Japanese Application No. 2002-503700, (May 10, 2011),5 pages.

"Foreign Office Action", Japanese Application No. 2002-503701, (May 31, 2011),10 pages.

"Notice of Reexamination", Chinese Application No. 01813138.7, (Apr. 22, 2011),14 pages.

"Supplemental Notice of Allowance", U.S. Appl. No.11/107,347, (Jun. 10, 2011),10 pages.

"Supplemental Notice of Allowance", U.S. Appl. No. 11/218,149, (Jun. 6, 2011), 2 pages.

"Supplemental Notice of Allowance", U.S. Appl. No. 11/931,730, (May 6, 2011), 2 pages.

Hall, Richard S., "Evaluating Software Deployment Languages and Schema", In Proceedings of International Conference on Software Maintenance, (Nov. 1998), 9 pages.

Hall, Richard S., et al., "Specifying the Deployable Software Description Format in XML", *CU-SERL-207-99*, Software Engineering Research Laboratory, University of Colorado at Boulder,(Mar. 31, 1999),17 pages.

\* cited by examiner

— 134

| Submit | Save Draft... | Open Draft... | View [Long ▾] | Print View | Update Form |

Person: My Name — 202

```
┌─────────────────────────────────────────────┐
│ [Test]      ☐ Manager                       │
│                    — 210                    │
│        Robert Jenkins        — 218          │
│ Name:                Role: Expert Accountant│
└─────────────────────────────────────────────┘
```
— 204

```
┌─────────────────────────────────────────────┐
│ [Test]      ☐ Manager                       │
│                    — 212                    │
│        Pete Jenkinson        — 220          │
│ Name:                Role: Author           │
└─────────────────────────────────────────────┘
```
— 206

```
┌─────────────────────────────────────────────┐
│ [Test]      ☐ Manager                       │
│                    — 214                    │
│        Henrietta Hastings    — 222          │
│        and her extended                     │
│ Name:  family        Role: Author           │
└─────────────────────────────────────────────┘
```
— 208

```
┌─────────────────────────────────────────────┐
│ [Test]      ☐ Manager                       │
│                    — 216                    │
│        Jennifer Jones        — 224          │
│ Name:                Role: Journalist       │
└─────────────────────────────────────────────┘
```

Add an address

Purpose: The purpose for this address list is as follows...
Contributor: Contributors name

| Submit | Save Draft... | Open Draft... | View [Long ▾] | Print View | Update Form |

| ▣ Submit | 🗋 Save Draft... | 🗋 Open Draft... | View [Long ▾] | 🖨 Print View | 📄 Update Form |

Person: My Name

┌─────────────────────────────────────────────┐
│ [Test]     ☐ Manager                         │
│                                              │
│         Robert Jenkins                       │
│ Name:                    Role: Expert Accountant │
└─────────────────────────────────────────────┘

┌─────────────────────────────────────────────┐
│ [Test]     ☐ Manager                         │
│                                              │
│         Pete Jenkinson                       │
│ Name:                    Role: Author         │
└─────────────────────────────────────────────┘

┌╴╴╴╴╴╴╴╴╴╴╴╴╴╴╴╴╴╴╴╴╴╴╴╴╴╴╴╴╴╴╴╴╴╴╴╴╴╴╴╴╴╴╴╴╴┐
┊ [Test]     ☐ Manager                         ┊
┊                                              ┊
┊  Henrietta Hastings                          ┊
┊  and her extended                            ┊ ─ 802
┊ Name: family          Role: [Screenwriter]   ┊
└╴╴╴╴╴╴╴╴╴╴╴╴╴╴╴╴╴╴╴╴╴╴╴╴╴╴╴╴╴╴╴╴╴╴╴╴╴╴╴╴╴╴╴╴╴┘

┌─────────────────────────────────────────────┐
│ [Test]     ☐ Manager                         │
│                                              │
│         Jennifer Jones                       │
│ Name:                    Role: Journalist     │
└─────────────────────────────────────────────┘

🗋 Add an address

Purpose: The purpose for this address list is as follows...
Contributor: Contributors name

| ▣ Submit | 🗋 Save Draft... | 🗋 Open Draft... | View [Long ▾] | 🖨 Print View | 📄 Update Form |

FIG. 8

ENABLING ELECTRONIC DOCUMENTS FOR LIMITED-CAPABILITY COMPUTING DEVICES

BACKGROUND

Currently, many users interact with network-enabled electronic documents, like web pages and electronic forms. They may do so through a computing device having extensive capabilities, like a desktop or laptop computer having a large screen, large memory capacity, and a fast processor. More and more, however, users want to interact with these documents through computing devices with more-limited capabilities, such as hand-held personal digital assistants (PDAs) and cellular phones.

SUMMARY

System(s), method(s), and/or techniques ("tools") are described that enable electronic document functionality for a limited-capability computing device. The tools may enable a computing device with limited display capabilities to present and enable navigation through nested items or hierarchical view levels of an electronic document. The tools may also build renderable view information by which a device may enable electronic document functionality based on the capabilities of that device.

In some cases the tools enable these and other techniques using an intermediary between a limited-capability computing device and a network computing architecture, where the network computing architecture is capable of enabling an electronic document's functionality on a high-capacity computing device but not on the limited-capacity computing device. This intermediary may enable the electronic document's functionality on the limited-capability computing device without requiring alteration to the electronic document or the network computing architecture.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

FIG. 2 illustrates an exemplary, editable electronic document displayed on a high-capability device.

FIG. 8 illustrates the exemplary, editable electronic document of FIG. 2 displayed on a high-capability device following an edit to the electronic document on a limited device.

The same numbers are used throughout the disclosure and figures to reference like components and features.

DETAILED DESCRIPTION

Overview

The following document describes tools capable of many powerful techniques, including enabling electronic document functionality in a limited-capability computing device. In some cases the tools enable these techniques with an intermediary acting between the limited-capability computing device and a network computing architecture. This intermediary may permit an existing network computing architecture and electronic document to be used, in some cases without alteration, to enable electronic document functionality in a device that the network computing architecture is otherwise incapable of enabling.

An environment in which the tools may enable these and other techniques is set forth first below in a section entitled Exemplary Operating Environment. This section is followed by another section describing processes for enabling these and other techniques, entitled Enabling Functionality for Limited Devices.

Exemplary Operating Environment

Before describing the tools in detail, the following discussion of an exemplary operating environment is provided to assist the reader in understanding some ways in which various inventive aspects of the tools may be employed. The environment described below constitutes but one example and is not intended to limit application of the tools to any one particular operating environment. Other environments may be used without departing from the spirit and scope of the claimed subject matter.

Figure 1:
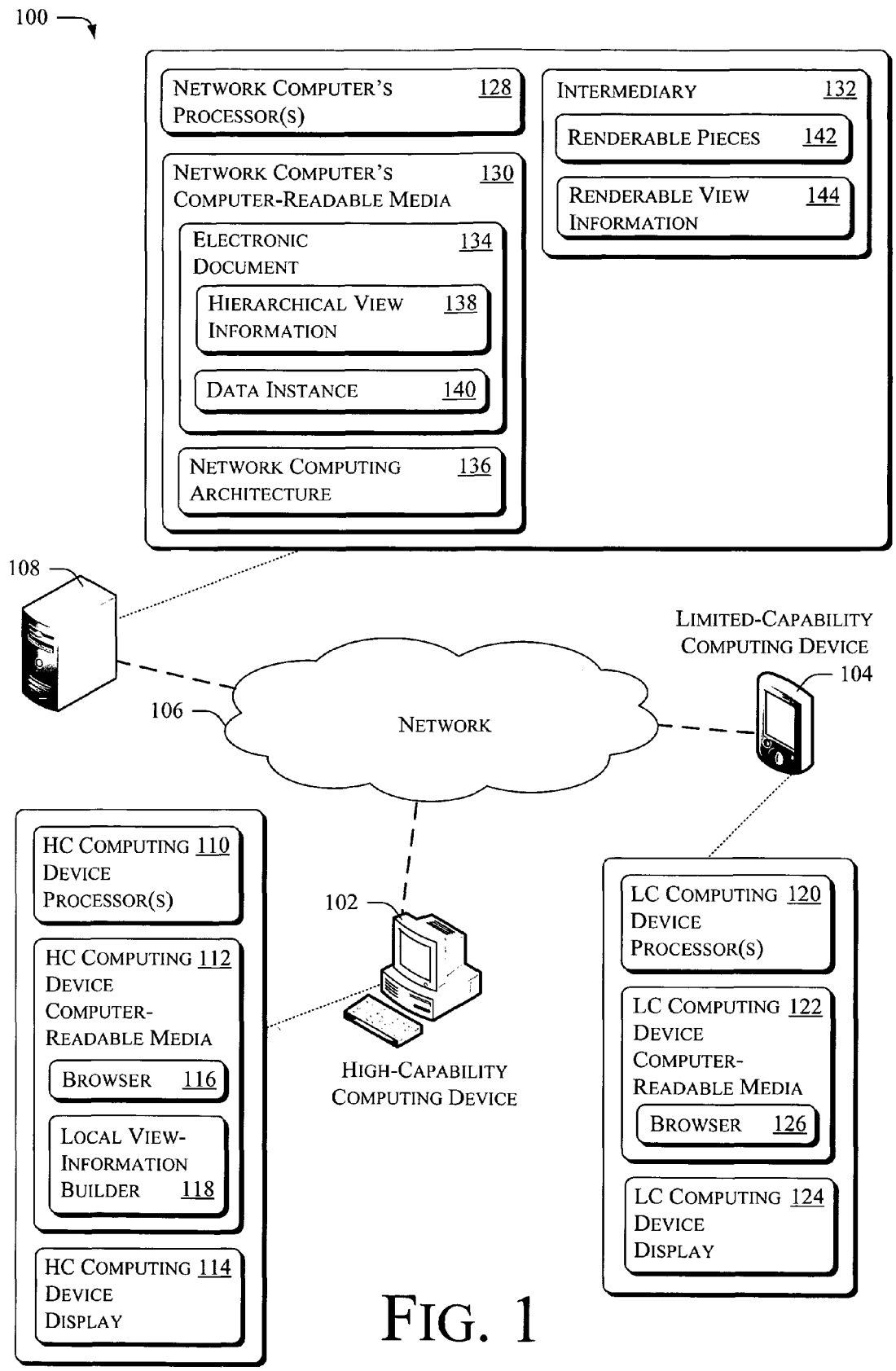
FIG. 1 illustrates an exemplary operating environment in which various embodiments can operate.

FIG. 1 illustrates one such operating environment generally at 100 having a high-capability computing device 102 ("high-capability device"), a limited-capability computing device 104 ("limited device"), a communication network 106, and a network computer 108.

The high-capability device has at least one high capability related to electronic documents, such as a display capable of presenting two or more hierarchical view levels and/or nested items (both described later below) or processor(s) and/or memory enabling view information to be built for a browser, such as by storing and executing software capable of building view information.

Here the high-capability device is shown having one or more processor(s) 110, computer-readable media 112, and a display 114. The processors are capable of accessing and/or executing the computer-readable media. The computer-readable media comprises or has access to a browser 116, which is a module, program, or other entity capable of interacting with a network-accessible entity (e.g., network computer 108), and local view-information builder 118. The browser is capable of rendering on the display renderable view information, such as information expressed using a markup-language (e.g., HTML: HyperText Markup Language or WML: Wireless Markup Language). The local view-information builder is capable of building renderable view information from non-renderable view information. In some cases the builder does so using hierarchical view information and renderable pieces of view information associable with the hierarchical view information.

Limited device 104 has at least one limited capability related to electronic documents, such as having a display incapable of presenting (in an appropriate size and readability to a user) two or more hierarchical view levels and/or nested items, or lacking the processor capabilities, memory, and/or installed modules or programs that would be required in order to allow view information to be built on the limited device. The limited device may be a small computing device, such as a handheld personal digital assistant or a cellular phone.

Here the limited device is shown having a processor 120, computer-readable media 122, and a display 124. The processors are capable of accessing and/or executing the computer-readable media. The computer-readable media comprise or have access to a browser 126, which is a module, program, or other entity capable of interacting with a network-accessible entity (e.g., network computer 108). The browser 126 is capable of rendering on the display 124 renderable view information and enabling interaction with an electronic document through that rendering, such as through a tablet screen or letter/number pad. The renderable view information may be information expressed using a markup-language (e.g., HTML or WML) or some other renderable format.

The operating environment's network 106 enables communication between the devices 102 and/or 104 and the network computer 108. The network may be a global or local, wired or wireless network, such as the Internet or a company's intranet.

Network computer 108 is shown having or having access to processor(s) 128, computer-readable media 130, and intermediary 132. The intermediary is shown with the network computer and may be part of the network computer's computer-readable media, though it may also be separate, such as on another network-accessible entity (e.g., another network computer).

The network computer's processor(s) are capable of accessing and/or executing computer-readable media 130. This computer-readable media comprises or has access to an electronic document 134 and a network computing architecture 136. The electronic document may be editable (such as an electronic form having data-entry fields) or uneditable (such as a webpage into which data entry or other edits cannot be made). It may also have two or more hierarchical viewing levels or levels of nested items.

In FIG. 2, for example, an exemplary, editable electronic document 134 is displayed on the high-capability device's display 114. The electronic document is shown having some top-level information (Person, Purpose, Contributor) together with a list of four people (or groups of people), 202, 204, 206, and 208, along with information about each of them, here their names 210, 212, 214, and 216, and their roles 218, 220, 222, and 224, both respectively. This information is displayed in data-entry fields through which a user may edit this information.

This rendering of the electronic document shows multiple levels of hierarchy on the display at once. There is the top-level information, and the first level of hierarchical information, here the people (or groups of people). Then there is the second level of hierarchical information—here the information about these people (their names and roles). The items of information in this second level are nested in relation to the first level.

Electronic document 134 comprises or has access to hierarchical view information 138 and, if the electronic document is editable, data instance 140. The hierarchical view information may comprise or represent many hierarchical view levels and nested items. For example, if an electronic document associated with the hierarchical view information about a company has vice presidents with managers and the managers have employees that they manage, the hierarchical view information may represent, in addition to the top-level information about the company, three hierarchical view levels—one level for all of the vice presidents, one for all of the managers, and one for all of the employees. Each hierarchical view level may have additional nested items. The additional nested items may contain further information related to the particular level in the hierarchy, such as nested items for each of the vice presents, each of the managers, or each of the employees. Nested items for each of the vice presidents may include information about that vice president, nested items for each of the managers may include information about the manager, and so forth.

Figure 3:
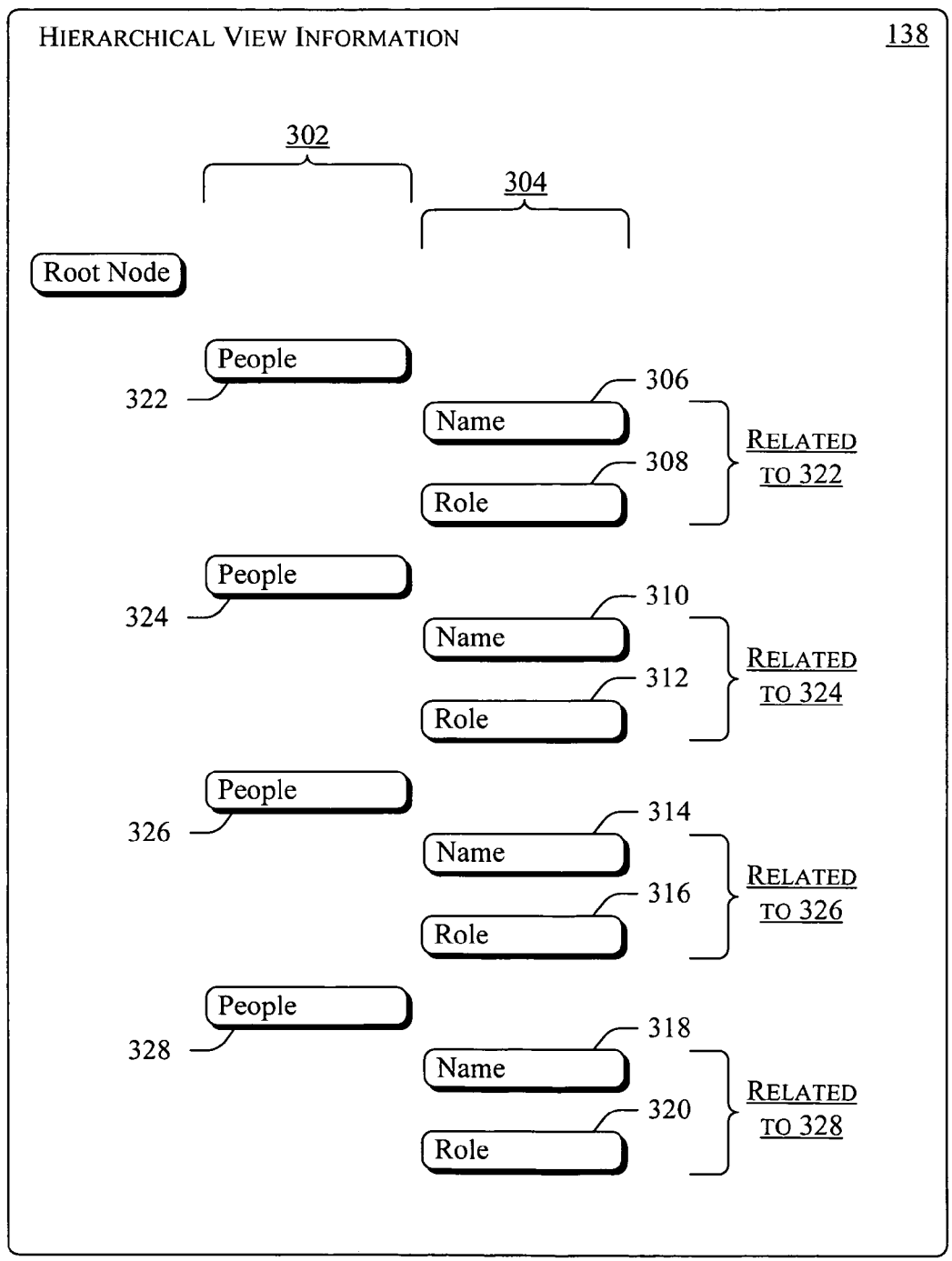
FIG. 3 illustrates exemplary hierarchical view information for the editable electronic document shown in FIG. 2.

In FIG. 3, exemplary hierarchical view information 138 is illustrated for the electronic document shown in FIG. 2. This hierarchical view information has the top-level Root Node, with a first hierarchical view level 302, and a second hierarchical view level 304. The nested items 306, 308, 310, 312, 314, 316, 318, and 320 are at the second hierarchical view level 304. Nested items 306 and 308 are related and provide information about people node 322 for the person named "Robert Jenkins," shown in FIG. 2. Nested items 310 and 312 are related and provide information about people node 324 for the person named "Pete Jenkinson." Nested items 314 and 316 are related and provide information about people node 326 for the group of people named "Henrietta Hastings and her extended family." Nested items 318 and 320 are related and provide information about people node 328 for the person named "Jennifer Jones."

Each nested item or set of nested items may also have a subordinate nested item and this subordinate nested item its own further subordinate nested item (not shown). For the exemplary hierarchical view information of FIG. 3, a subordinate nested item could comprise items of information about a person's role, for instance.

Returning to FIG. 1, network computing architecture 136 is capable of enabling electronic document functionality for the high-capability device. In some cases the network computer does so through a smart rendering architecture (e.g., AJAX) with script and XMLHTTP (extensible Markup Language (XML) HyperText Transfer Protocol (HTTP)).

This functionality may include display of all or multiples of the electronic document's hierarchical levels or nested items for the electronic document, and enabling and storing edits to the electronic document (e.g., in a data instance for an editable electronic document), and executing business logic (i.e. special code or complex behavior) incorporated into, or associated with, the electronic document. The network computing architecture may not be able, on the other hand, to enable all of these electronic document's functionalities for the limited device.

Intermediary 132 acts between the limited device and the network computing architecture to enable electronic document functionality in the limited device. The intermediary may, for example, enable (in conjunction with the network architecture) each hierarchical level and every nested item to be displayed and interacted with through a limited device. It may do so even if that limited device does not have a display capable of presenting at one time multiple hierarchical levels or nested items that the high-capability device might otherwise present at once.

The intermediary may also enable functionality for a same electronic document to which the network computing architecture enables functionality for a high-capability device. The intermediary may enable this functionality without altering the electronic document or its business logic, the network architecture, and/or a data instance of the electronic document. By so doing, the intermediary may allow a user to edit a data instance of an electronic document with a high-capability device and maintain these edits for continued editing of the same data instance with a limited device and vice-a-versa. By enabling functionality without altering the network computing architecture, the intermediary permits an existing network architecture capable of enabling functions of a high-capability device to be used to enable the same or similar functionality for a limited device.

The intermediary has renderable pieces 142 by which it may build renderable view information 144. With this renderable view information, a limited device's browser may render and enable functions of an electronic document. Ways in which the intermediary may build this renderable view information are described in greater detail below.

Enabling Functionality for Limited Devices

The following discussion describes exemplary ways in which the tools enable electronic document functionality for a limited device and other inventive techniques. The tools permit a single electronic document or its data instance to be used to enable functionality for that electronic document with both limited and high-capability devices. This interoperability permits a programmer to build a single electronic document and have that electronic document usable by users of both high-capability and limited devices. This interoperability also permits users to interact with the same data instance of an electronic document with a limited device and a high-capability device.

Figure 4:
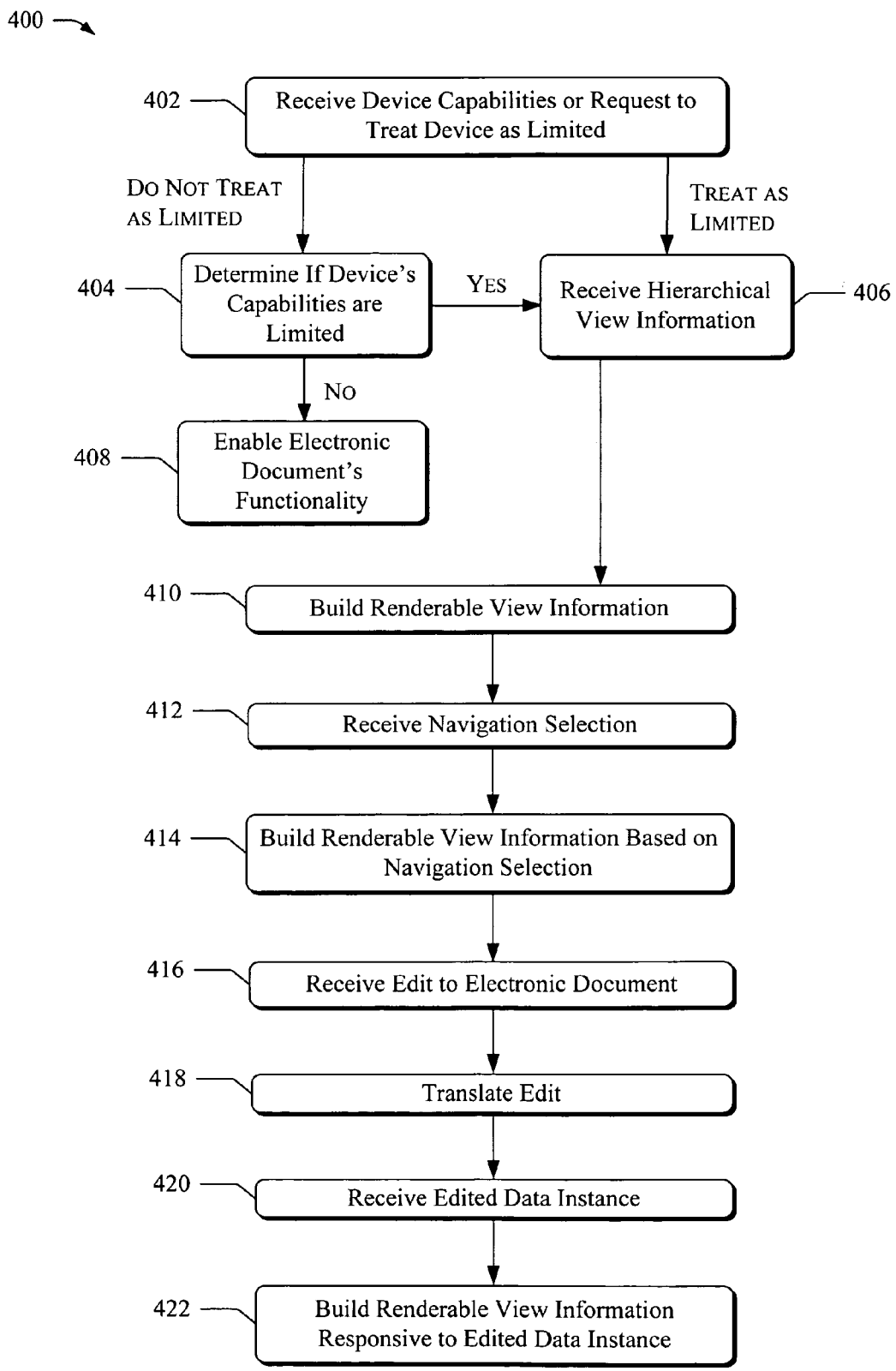
FIG. 4 is an exemplary process describing manners in which the tools enable electronic document functionality.

FIG. 4 is an exemplary process 400 enabling electronic document functionality. It is illustrated as a series of blocks representing individual operations or acts performed by elements of operating environment 100 of FIG. 1, such as intermediary 132 and network computing architecture 136. This process may be implemented in any suitable hardware, software, firmware, or combination thereof; in the case of software and firmware, this process represents a set of operations implemented as computer-executable instructions stored in computer-readable media and executable by one or more processors.

Block 402 receives a request to treat a device as limited or receives capabilities of the device, such as the size of the device's display or memory, its processor speed, and/or its local software capabilities. Continuing the embodiment described above, assume that the device's capabilities correspond to the high-capability device 102 or the limited device 104.

If no request to treat the device as limited is received, block 402 proceeds along the "Do Not Treat as Limited" path to block 404. If the device is requested to be treated as limited, block 402 proceeds to block 406 along the "Treat as Limited" path.

Block 404 determines whether the device has limited capabilities and proceeds to blocks 406 or 408. If the device has limited capabilities, such as limited device 104 of FIG. 1, it proceeds to block 406 along the "Yes" path. If not, it proceeds along the "No" path to block 406.

Block 404 may determine this based in part on a particular electronic document being requested or the network computing architecture for which intermediary 132 is interceding. Thus, if the network computing architecture is capable, without assistance from the intermediary, of enabling a particular electronic document's functionality for a particular device, the intermediary may make this determination and refrain from continuing to intercede. If a device has a limited processor, but the network computing architecture is still capable of enabling a requested electronic document's functionality without aid from the intermediary, the tools may proceed along the "No" path even though the device has some limitations. In so doing, block 404 may determine whether or not the device's capabilities are too limited for the network computing architecture to enable a requested electronic document's functionality without assistance.

Here we assume first that block 404 determines that the device does not have limited capabilities (e.g., the request is from high-capability device 102) and so proceeds to block 406.

Block 408 enables functionality for the requested electronic document. Here the network computing architecture enables the high-capability device to edit, display, and otherwise use electronic document 134. In some cases the network computing architecture does so by creating renderable view information (similar or dissimilar to renderable view information 144) for the high-capability device to render (e.g., HTML or WML).

In another case, the network computing architecture sends the hierarchical view information 138 and renderable pieces 142 for the electronic document to the high-capability device (renderable pieces 142 are shown in intermediary 132 but may also be stored or accessible by the network computing architecture). The high-capability device may then build renderable view information using local view-information builder 118. This view information may then be rendered by browser 116, here as shown in FIG. 2. In this case edits to an electronic document may be reflected (though not actually made to the electronic document's data instance) without a postback to the network computer. The local view-information builder may render edits as if they were made to the electronic document's data instance. The edits may be retained by the high-capability device in an event log, which may later be submitted to the network computer. The network computing architecture may then receive the edits in the event log and make the appropriate changes to the data instance for that electronic document.

If block 404 determines that the device's capabilities are limited, however, it proceeds to block 406 rather than block 408. Block 406 receives hierarchical view information associated with an electronic document and having hierarchical viewing levels and/or nested items. The hierarchical view information may be a set of relationships derived from a data model for an electronic document, such as a name-value-pair table of records or a hierarchical data model. The hierarchical view information indicates relationships between portions of an electronic document, such as a manager having nested information about the manager and employees for which the manager is responsible.

In this particular case intermediary 132 receives the exemplary hierarchical View information 138 shown in FIG. 3.

Block 410 builds renderable view information enabling a limited device to enable an electronic document's functionality. Block 410 may do so without user interaction in cases where a user does not specifically select to treat the device as limited.

This renderable view information may permit a device having limited capabilities to enable a user to interact with the electronic document sufficient to allow use of the electronic document's functionality. One such case is where the viewing capabilities of the device do not permit viewing multiple hierarchical view levels. In this case block 410 may build the renderable view information to present just those levels viewable on the limited capability display.

While the electronic document may appear different visually, the functionality permitted by the network computing architecture in conjunction with the intermediary and limited device may be identical to that enabled by the network computing architecture and the high-capability device without the intermediary.

Here block 410 builds renderable view information enabling the limited device to present a first hierarchical view level and indicia by which a user may select to proceed to another hierarchical view level (or nested items of the first hierarchical view level). In so doing, the intermediary may switch between a smart rendering architecture used by the network computing architecture and XMLHTTP and a simpler HTML (or WML) based renderable view information enabling the limited device to present hierarchical view levels and otherwise enable the electronic document's functionality. To use the simpler HTML-based renderable view information, the limited device may communicate interactions with the electronic document to the intermediary using full-page postback.

Figure 5:
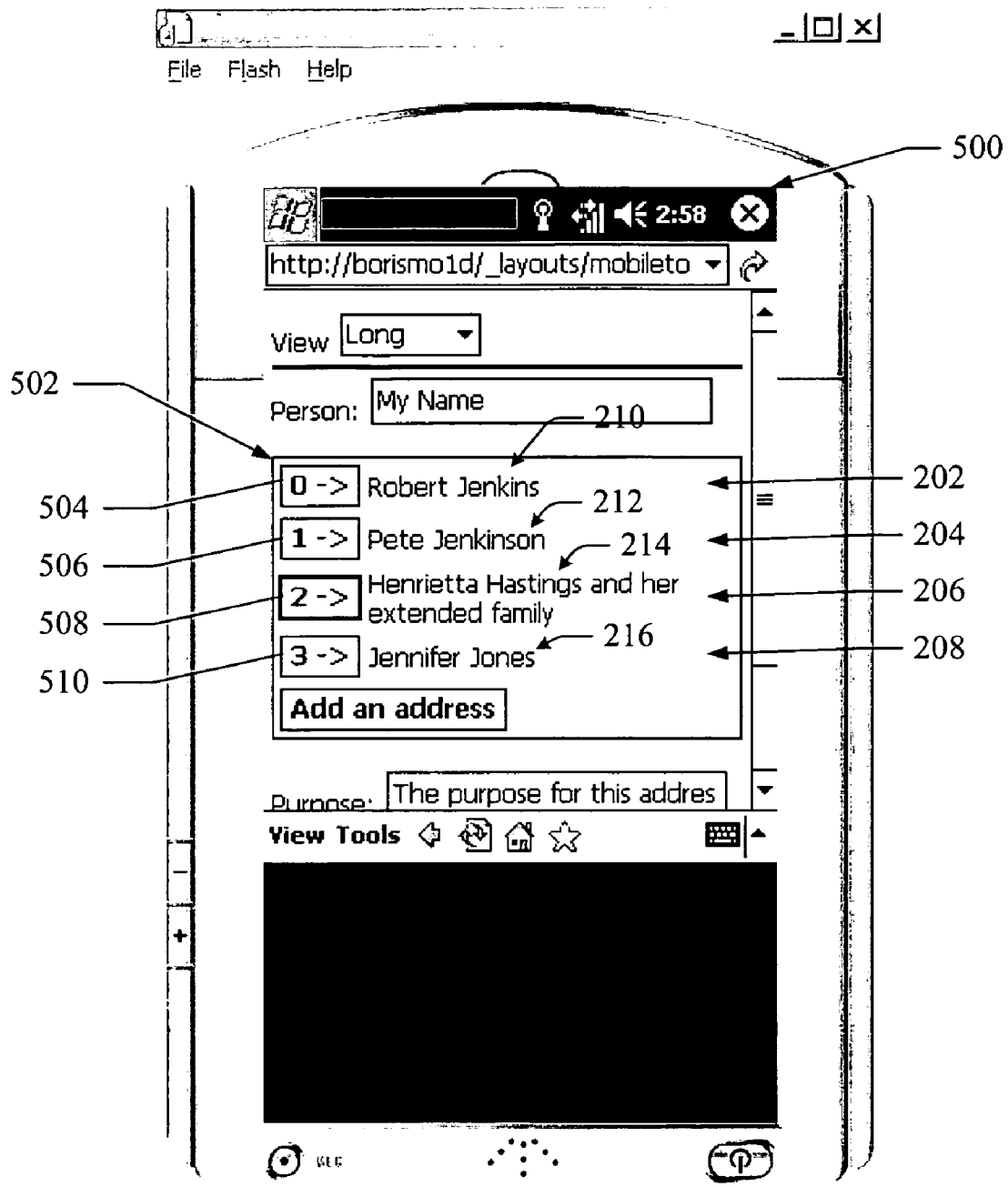
FIG. 5 illustrates an exemplary rendering of the exemplary editable electronic document shown in FIG. 2 but displayed instead on a limited device and showing one hierarchical view level.

FIG. 5 sets forth an exemplary rendering 500 of the same exemplary electronic document shown in FIG. 2, though here displayed with limited device 104 and showing the top-level content (here, Person and Purpose), along with just one hierarchical view level 502 rather than two. The hierarchical view level 502 corresponds to the first hierarchical level 302 of FIG. 3, that of four people, 202, 204, 206, and 208. Note that the size of this display is incapable of presenting at once nested items from a second hierarchical view level (in this example, Role—or any other nested items from that level of the hierarchy) along with items from the first hierarchical view level. Nor could other items from deeper levels of hierarchy be shown at the same time (such as additional information about each Role).

The intermediary may enable the limited device to show this hierarchical level with information about the items in this level. The intermediary, when building the renderable view information, may extract textual information about items in one level (here the people), by retrieving just the first textual, nested item at the next level (here the name). Here the intermediary extracts the people's names 210, 212, 214, and 216 from nodes 306, 310, 314, and 316 of FIG. 3, respectively.

The intermediary also permits the limited device to navigate through the electronic document. This enables the user to interact with the functions and information of the electronic document even when the user may not be able to see or interact with all of these functions at one time.

Here the intermediary adds selectable indicia 504, 506, 508, and 510 to the renderable view information by which a user may navigate through hierarchical view levels and nested items. The selectable indicia may be geographically associated with information, be the information itself, or otherwise indicate the item and enable selection. Here a user selects to view and interact with the nested items of the group of people associated with indicia 508.

Block 412 receives a selection to navigate to another hierarchical view level and/or nested items. The selection may be to a higher or lower hierarchical view level or nested items, such as to multiple levels of subordinate nested items.

Block 414 builds another renderable view information responsive to the user's selection to navigate. Here the intermediary builds renderable view information to present the nested items, here "name" and "role" associated with "Henrietta Hastings and her extended family."

Figure 6:
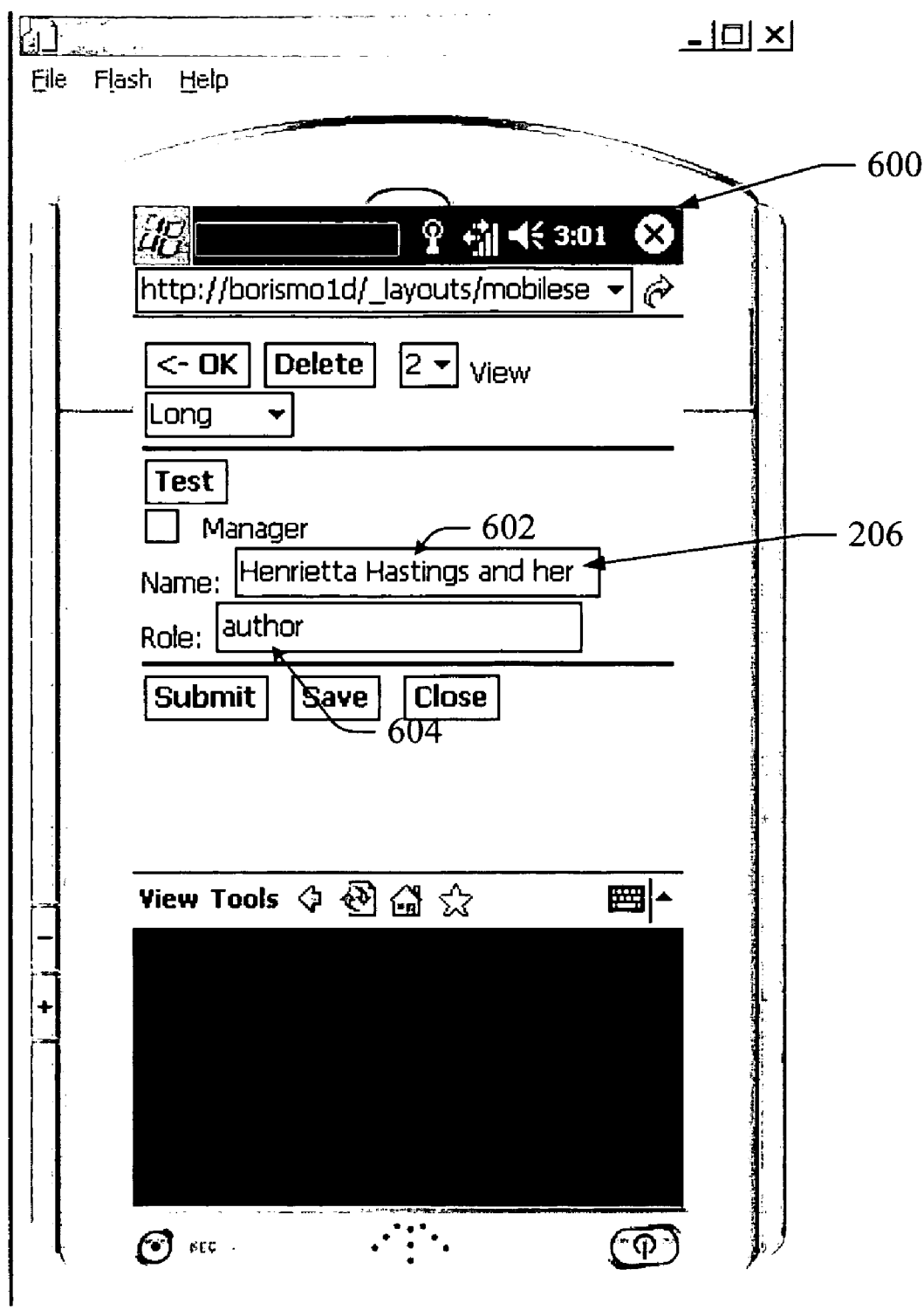
FIG. 6 illustrates an exemplary rendering of the exemplary editable electronic document shown in FIGS. 2 and 5 but displaying nested items of a second hierarchical view.

FIG. 6 sets forth an exemplary rendering 600 of the same exemplary electronic document shown in FIGS. 2 and 5, though here displaying nested items of a second hierarchical view that are associated with the selected indicia. Rendering 600 shows information 602 and 604 from nested items 314 ("name") and 316 ("role") that are related to people 326 of FIG. 3. Information from these same nested items are also shown in FIG. 2 at 214 and 222.

Each of these two renderable view information may also enable a user to edit the electronic document's data, assuming it is an editable electronic form. In rendering 600, for instance, a user may edit the group's name or role.

Figure 7:
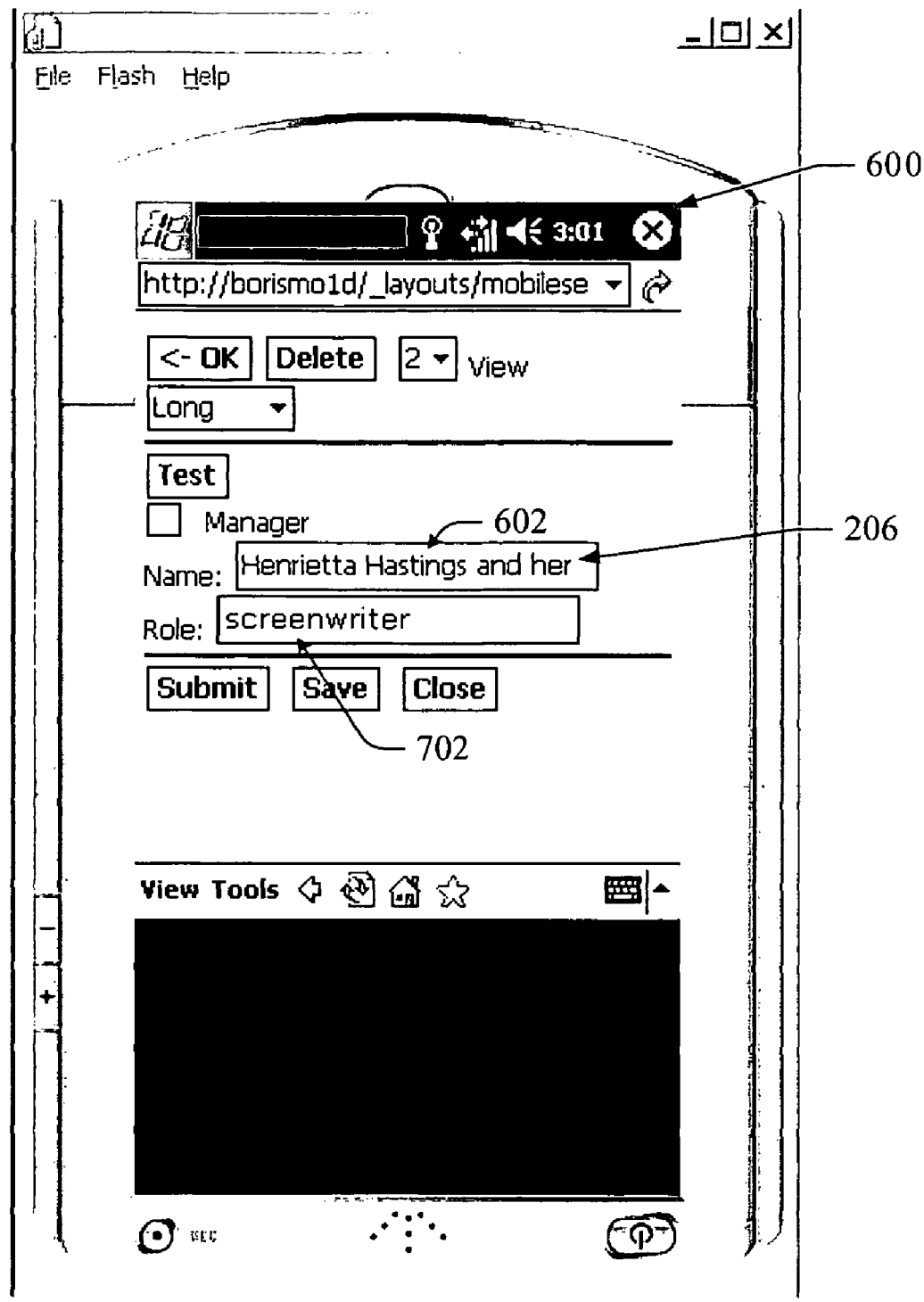
FIG. 7 illustrates the rendering of FIG. 6 following an edit.

FIG. 7 shows an edit to Henrietta's role, here changing it from "author" to "screenwriter" at 702. The limited device (or high-capability device if selected to be treated as a limited device) may submit this to the intermediary, such as when a user tabs out of the field or presses a submit or save button.

Block 416 receives an edit to an electronic document. The edit may be to change something in an item or nested item, add items, or perform operations (e.g., business logic operations such as zip-code correction or tax calculations). Here the intermediary receives an edit to change the contents of nested item 316 of FIG. 3. The intermediary may receive the edit as a postback name-value pair or otherwise.

Block 418 translates the edit. The edit may or may not be in a form understandable by the network computing architecture. Here the edit is received by the intermediary as a postback name-value pair. The network computing architecture is built to receive and handle edits in the form of an event log. So here the intermediary translates this postback into an event log. The network computing architecture receives the event log, alters the data instance to reflect the edit in the event log, and sends the altered data instance to the intermediary. This is one way in which the same data instance of an electronic document may be edited by a limited device and a high-capability device. Here the data instance is altered to reflect the edit from "author" to "screenwriter" as if the edit were made to a high-capability device handled directly by the network computing architecture.

Block 420 receives results based on the edit. Here the intermediary receives the edited data instance from the network computing architecture.

Block 422 builds renderable view information responsive to the altered data instance. Here again the intermediary builds renderable view information based on the hierarchical view information and the renderable pieces. When there is a data instance (as in the ongoing example), it is also used to build the renderable view.

With the altered data instance, the intermediary builds renderable view information capable of being rendered by the limited device and showing the results of the edit. Here that result is simply changing the role from author to screenwriter. In some cases, however, the result of an edit may cause a substantial change to the data instance and the hierarchical view information. If the edit caused many data-entry fields to be altered or added, the intermediary may still build renderable view information to reflect and enable functionality associated with this change.

The tools may enable edits to an electronic document made with a high-capability device or limited device to be interchangeable. As described above, a user can make an edit to an electronic document with either device and have that edit reflected in the electronic document's data instance. Thus, if the user later returns to the electronic document using a different device, he or she may continue to edit the electronic document's data instance. An example of this interoperability is shown in FIG. 8.

FIG. 8 sets forth a rendering 800 displayed on the high-capability device showing the results of the user's edit made through the limited device. The edit to Henrietta's role is shown at 802.

Blocks 412 and 414 may be repeated, as may blocks 416, 418, 420, and 422. Thus, a user may continue to navigate back and forth through hierarchical view levels and many levels of nested items to view and interact with functionality of an electronic document. The user may also make many edits to an electronic document and see the results of these edits.

CONCLUSION

The above-described systems and methods enable electronic document functionality for a limited-capability computing device. These systems and methods may do so using an existing network computing architecture and electronic document that otherwise may not be able to permit this functionality through a limited-capability computing device. By so doing, these systems and methods permit interoperability between high-capability computing devices and limited-capability computing devices. They also permit existing electronic documents and network computing architecture to be reused, thereby potentially saving extensive programming and computing resources. Although the systems and methods have been described in language specific to structural features and/or methodological acts, it is to be understood that the systems and methods defined in the appended claims are not necessarily limited to the specific features or acts described. Rather, the specific features and acts are disclosed as exemplary forms of implementing the claimed systems and methods.

The invention claimed is:

1. One or more computer-readable media residing on a computer and having computer-readable instructions therein that, when executed by the computer, cause the computer to:
   act as an intermediary between a limited-capability computing device and a network computing architecture, the network computing architecture being capable of enabling an editable electronic document functionality on a high-capability computing device but not on the limited-capability computing device, the computer being remote from the high-capability computing device and the limited-capability computing device;
   determine, based on the editable electronic document functionality and viewing capabilities of the limited-capability computing device, that the network computing architecture is incapable of enabling the editable electronic document functionality on the limited-capability computing device without external assistance, the editable electronic document functionality including at least some view information associated with an editable electronic document that is requested by the limited-capability computing device from the network computing architecture;
   enable the limited-capability computing device to perform the editable electronic document functionality; and
   edit an instance of the editable electronic document that is associated with the editable electronic document functionality and that is stored on the computer but not on the limited-capability computing device, wherein editing the instance of the editable electronic document includes executing one or more business logic operations via the instance of the editable electronic document and responsive to input to the limited-capability computing device, the editing comprising:
   receiving, from the limited-capability computing device, a postback that comprises a name-value pair;
   translating the postback into an event log; and
   editing the instance of the editable electronic document based on the event log.

2. The media of claim 1, wherein the editable electronic document functionality comprises interacting with nested items of the editable electronic document.

3. The media of claim 1, wherein the editable electronic document functionality is enabled by business logic associated with the editable electronic document, and wherein the instructions are capable, when executed and in conjunction with network computing architecture, of enabling the business logic on both the limited-capability computing device and the high-capability computing device without altering the business logic.

4. The media of claim 1, wherein the instructions, when executed, are further capable of enabling the network computing architecture to enable use of a representation of the instance of the editable electronic document on both the limited-capability computing device and the high-capability computing device.

5. The media of claim 1, wherein the network computing architecture enables the editable electronic document functionality on the high-capability computing device using script and eXtensible Markup Language HyperText Transfer Protocol (XMLHTTP) and wherein the instructions, when executed, are capable of switching between the script and XMLHTTP to a HyperText Markup Language (HTML) or Wireless Markup Language (WML) based renderable view information, the HTML or WML-based renderable view information enabling the limited-capability computing device to perform the editable electronic document functionality using full-page postback with the media.

6. A computer-implemented method comprising:
   determining, based on one or more functionalities of an editable electronic document requested by a limited-capability computing device from a remote resource and based on viewing capabilities of the limited-capability computing device, that the limited-capability computing device is incapable, without external assistance, of rendering at least some view information of the editable electronic document;
   building, responsive to the determining and using one or more computing devices, first renderable view information that is associated with the editable electronic document and usable by the limited-capability computing device to present an item of the editable electronic document and to present indicia associated with a nested item for that item, and enabling selection of the indicia;
   building, responsive to receiving an indication of a selection of one of the indicia and using one or more of the one or more computing devices, a second renderable view information usable by the limited-capability computing device to present the nested item associated with the indicia effective to permit a user to navigate to the nested item, wherein one or more of the first renderable view information or the second renderable view information are configured to be utilized by the limited-capability computing device to edit an instance of the editable electronic document and to execute one or more business logic operations on the instance of the editable electronic document, the instance of the editable electronic document being stored at the remote resource, wherein the remote resource is remote from the limited-capability computing device and not on the limited-capability computing device; and
   editing the instance of the editable electronic document responsive to input received from the limited-capability computing device, wherein the editing comprises:
   receiving a postback that comprises a name-value pair;
   translating the postback into an event log; and
   editing the instance of the editable electronic document based on the event log.

7. The method of claim 6, wherein the second renderable view information comprises a second indicia and further comprising, responsive to receiving an indication of a selection of the second indicia, building a third renderable view information usable by the limited-capability computing device to present an item subordinate to the nested item or an item superior to the nested item effective to permit the user to navigate to the subordinate or superior item.

8. The method of claim 6, further comprising receiving hierarchical view information associated with the editable electronic document and having the item and the nested item and wherein the act of building builds the first renderable view information based on the hierarchical view information and renderable pieces of view information.

9. The method of claim 8, wherein the hierarchical view information further comprises an item subordinate to the nested item, and wherein the method is further effective to enable a user to navigate through the hierarchical view information to navigate to the item, the nested item, and the subordinate item.

10. The method of claim 6, wherein the indicia comprises text from a textual nested item related to said nested item or from said nested item.

11. The method of claim 6, wherein the act of building the first renderable view information is performed without user interaction.

12. The method of claim 6, further comprising receiving an edit to the nested item, altering the instance of the editable electronic document responsive to the edit, and enabling a higher-capability computing device to view and interact with the instance of the editable electronic document.

13. The method of claim 6, wherein the limited-capability of the limited-capability device is a display incapable of presenting at once the nested item, its sibling nested items, and superior or subordinate items of the nested item and the superior or subordinate item's sibling nested items.

14. A computer-implemented method comprising:
receiving, using a first computing device, viewing capabilities of a second computing device or a request to treat the second computing device as not permitting two or more hierarchical viewing levels to be presented at once;
building, if the viewing capabilities permit two or more of the hierarchical viewing levels to be presented at once, using the first computing device, and from hierarchical view information associated with an editable electronic document having hierarchical viewing levels, renderable view information by which the second computing device is enabled to present the two or more of the hierarchical viewing levels, or
building, if the viewing capabilities do not permit two or more of the hierarchical viewing levels to be presented at once or the request is received, using the first computing device, and from the hierarchical view information associated with the editable electronic document having hierarchical viewing levels, renderable view information by:
extracting textual information about items in one of the two or more hierarchical viewing levels that are presented;
retrieving only a first textual nested item at a next hierarchical viewing level for presentation associated with the one of the two or more hierarchical viewing levels that are presented; and
enabling the second computing device to present the one of the two or more hierarchical viewing levels with the first textual nested item from the next hierarchical viewing level;
enabling, using the first computing device, an edit to an instance of the editable electronic document through the renderable view information, the renderable view information being separate from the instance of the editable electronic document; and
editing, using the first computing device, the instance of the editable electronic document responsive to receiving an indication of an edit to one or more of the hierarchical viewing levels via the renderable view information to provide an edited instance of the editable electronic document, the indication of the edit to the one or more of the hierarchical viewing levels being received from the second computing device and the editing including causing one or more business logic operations to be executed via the instance of the editable electronic document, the second computing device displaying the renderable view information and being remote from a resource on which the editable electronic document is edited and stored, wherein the editing comprises:
receiving the indication of the edit as a postback that comprises a name-value pair;
translating the postback into an event log; and
editing the instance of the editable electronic document based on the event log.

15. The method of claim 14, further comprising building the renderable view information with indicia, selection of one or more of the indicia enabling a user to select to view another hierarchical level.

16. The method of claim 15, further comprising building the different renderable view information responsive to a selection to view another hierarchical level and by which the second computing device is enabled to present said another hierarchical level.

17. The method of claim 14, wherein the request is not received and the act of building is performed without user interaction.

18. The method of claim 14, wherein the editable electronic document is an editable electronic form.

19. The method of claim 18, further comprising, if the viewing capabilities permit two or more of the hierarchical viewing levels to be presented at once, building different renderable view information by which a different computing device with different viewing capabilities that do not permit two or more of the hierarchical viewing levels to be presented at once is enabled to continue editing the edited data instance.

20. The method of claim 18, further comprising, if the viewing capabilities do not permit two or more of the hierarchical viewing levels to be presented at once or the request is received, building different renderable view information by which a different computing device with different viewing capabilities that permit two or more of the hierarchical viewing levels to be presented at once is enabled to continue editing the edited data instance.

* * * * *